US012753287B2

(12) United States Patent
Kondo et al.

(10) Patent No.: US 12,753,287 B2
(45) Date of Patent: Oct. 6, 2026

(54) POLYOLEFIN RESIN FOAM SHEET AND LAMINATE

(71) Applicant: Toray Industries, Inc., Tokyo (JP)

(72) Inventors: Hirotaka Kondo, Shiga (JP); Yoshiyuki Oka, Shiga (JP)

(73) Assignee: Toray Industries, Inc., Tokyo (JP)

( * ) Notice: Subject to any disclaimer, the term of this patent is extended or adjusted under 35 U.S.C. 154(b) by 230 days.

(21) Appl. No.: 17/919,802

(22) PCT Filed: Apr. 23, 2021

(86) PCT No.: PCT/JP2021/016491
§ 371 (c)(1),
(2) Date: Oct. 19, 2022

(87) PCT Pub. No.: WO2021/220967
PCT Pub. Date: Nov. 4, 2021

(65) Prior Publication Data

US 2023/0151171 A1 May 18, 2023

(30) Foreign Application Priority Data

May 1, 2020 (JP) ................................ 2020-081532

(51) Int. Cl.
*C08J 9/00* (2006.01)
*B32B 5/18* (2006.01)
*C08J 9/10* (2006.01)

(52) U.S. Cl.
CPC ............... *C08J 9/0061* (2013.01); *B32B 5/18* (2013.01); *C08J 9/103* (2013.01);
(Continued)

(58) Field of Classification Search
CPC ...... B29C 2035/0827; B29C 2035/085; B29C 2035/0872; B29C 2035/0877;
(Continued)

(56) References Cited

U.S. PATENT DOCUMENTS

2021/0130564 A1* 5/2021 Honda .................... C08J 9/103

FOREIGN PATENT DOCUMENTS

JP 2002-053691 A 2/2002
JP 2009-235329 A 10/2009
(Continued)

OTHER PUBLICATIONS

International Search Report dated Jul. 13, 2021 in counterpart International Application No. PCT/JP2021/016491.
(Continued)

*Primary Examiner* — Hai Vo
(74) *Attorney, Agent, or Firm* — DLA Piper LLP (US)

(57) ABSTRACT

A polyolefin resin foam sheet includes a resin mixture as a base resin, the resin mixture including 0% by mass or more and 30% by mass or less of polyethylene resin, 30% by mass or more and 80% by mass or less of polypropylene resin, and 20% by mass or more and 40% by mass or less of a polyolefin elastomer, the polyolefin resin foam sheet fulfilling a range of −35% or more and 0% or less for dimensional changes in machine and transverse directions under heating for 10 minutes at a temperature 20° C. higher than a maximum melting point that is a highest melting peak in a differential scanning calorimetry.

11 Claims, 1 Drawing Sheet

(52) U.S. Cl.
CPC ..... *B32B 2266/025* (2013.01); *B32B 2307/50* (2013.01); *B32B 2307/732* (2013.01); *B32B 2605/08* (2013.01); *C08J 2203/184* (2013.01); *C08J 2323/06* (2013.01); *C08J 2323/12* (2013.01)

(58) Field of Classification Search
CPC ............ B29C 44/505; B32B 2266/025; B32B 2266/12; B32B 2274/00; B32B 2307/50; B32B 2307/54; B32B 2307/72; B32B 2307/732; B32B 2307/734; B32B 2307/7376; B32B 2605/08; B32B 27/065; B32B 27/285; B32B 27/302; B32B 27/304; B32B 27/306; B32B 27/32; B32B 27/34; B32B 27/40; B32B 5/022; B32B 5/18; B32B 5/245; C08J 2201/026; C08J 2201/03; C08J 2203/184; C08J 2323/06; C08J 2323/12; C08J 2423/06; C08J 2453/00; C08J 9/0061; C08J 9/103
See application file for complete search history.

(56) References Cited

FOREIGN PATENT DOCUMENTS

| | | | | | |
|---|---|---|---|---|---|
| JP | 2015-187232 | A | | 10/2015 | |
| JP | 2016-155344 | A | | 9/2016 | |
| WO | 2018/025343 | A1 | | 2/2018 | |
| WO | WO-2018163612 | A1 | * | 9/2018 | ................ C08J 9/36 |

OTHER PUBLICATIONS

Written Opinion dated Jul. 13, 2021 in counterpart International Application No. PCT/JP2021/016491.
First Office Action dated Aug. 27, 2023, of counterpart Chinese Patent Application No. 202180029882.2, along with an English translation.

* cited by examiner

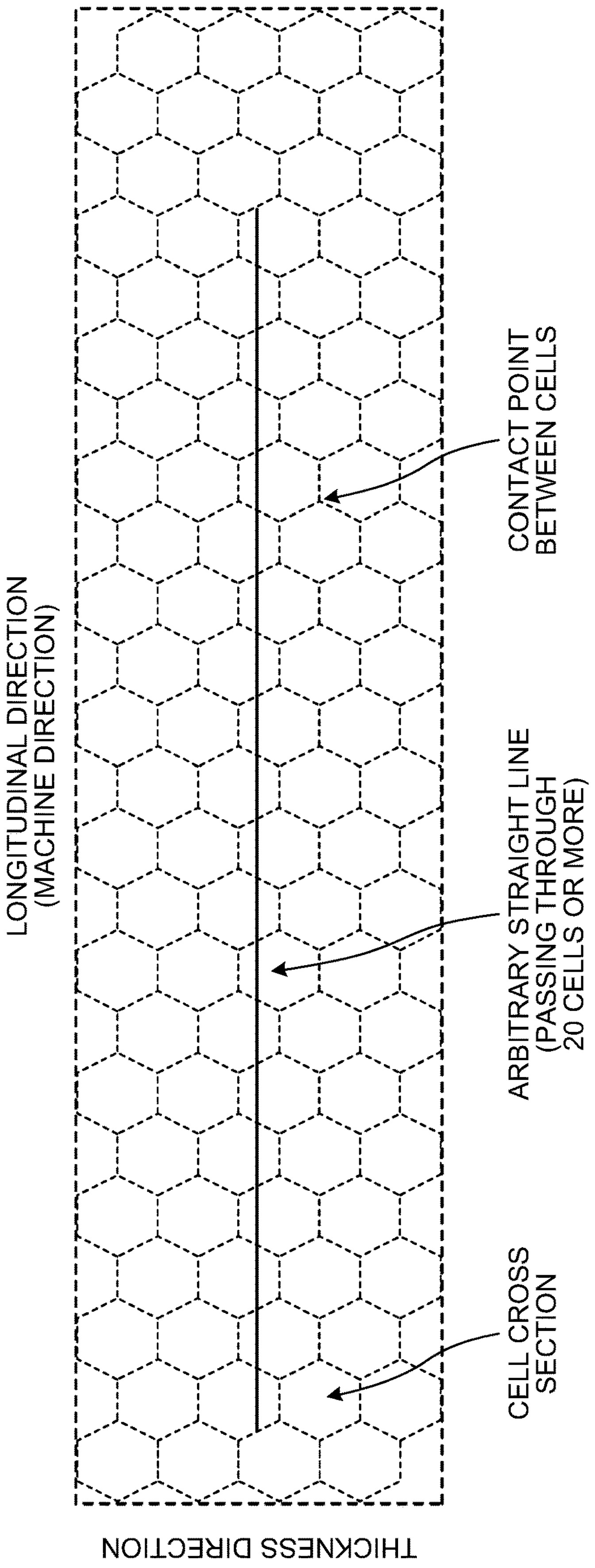
LONGITUDINAL DIRECTION
(MACHINE DIRECTION)
CONTACT POINT
BETWEEN CELLS
ARBITRARY STRAIGHT LINE
(PASSING THROUGH
20 CELLS OR MORE)
CELL CROSS
SECTION
THICKNESS DIRECTION

POLYOLEFIN RESIN FOAM SHEET AND LAMINATE

TECHNICAL FIELD

This disclosure relates to polyolefin resin foam sheets and laminates having excellent flexibility and formability.

BACKGROUND

Conventionally, cross-linked foam sheets using polyolefin resin as the base resin have been used as automobile interior materials such as ceilings, door panels, and instrument panels, for example, because of their excellent flexibility, heat resistance, and mechanical strength. In those applications, demand for foams with enhanced flexibility is increasing to provide a sense of luxury through moderate flexibility and provide functionality to reduce burden in armrests and other areas that come into contact with humans.

Such a polyolefin resin foam sheet was proposed: a polyolefin resin foam sheet that contains 15 parts by mass or more and 75 parts by mass or less of an olefin block copolymer fulfilling a melting point of 115° C. or more and a melt index of 0.1 g/10 min or more and 40 g/10 min or less (190° C.) and 25 parts by mass or more and 85 parts by mass or less of polypropylene resin fulfilling a melt index of 0.1 g/10 min or more and 25 g/10 min or less (230° C.). The polyolefin resin foam sheet has a gel fraction of 20% or more and 75% or less and a density of 25 kg/m$^3$ or more and 250 kg/m$^3$ or less (see Japanese Patent Application Laid-open No. 2015-187232, for example).

Furthermore, a laminate and an automobile interior formed by laminating a polyolefin resin foam on a surface body, were proposed. The polyolefin resin contains 30% by mass or more and 60% by mass or less of polypropylene resin, 1% by mass or more and 20% by mass or less of polyethylene resin, and 30% by mass or more of a thermoplastic elastomer resin in 100% by mass of the polyolefin resin constituting the polyolefin resin foam (see Japanese Patent Application Laid-open No. 2016-155344, for example).

The manufacturing methods for the above polyolefin foam sheets and polyolefin foam bodies are not particularly limited, but can be broadly classified into the following steps: a step of forming the resin composition into a sheet shape to obtain a foamable sheet, a step of cross-linking the foamable sheet, and a step of heating and foaming the cross-linked foamable sheet to obtain a foam sheet. For productivity reasons, the step of obtaining the foam sheet often involves continuously supplying a rolled cross-linked foamable sheet to a heat medium to foam it and then rolling it up as a rolled foam sheet. At this time, although it depends on the degree of foaming, the machine direction stretch ratio, calculated by dividing the take-up speed by the unwinding speed, is generally conducted under conditions exceeding 3.0. To prevent sagging and wrinkling during foaming, it is more efficient to increase the machine direction stretch ratio during foaming. Especially when polyolefin elastomer resin is contained, it has been produced at a high stretch ratio because of the risk of sticking to rolls and the like.

JP '232 and JP '344 disclose the polyolefin foam sheet and the laminate using polyolefin foam with excellent flexibility, but do not disclose sufficient study on formability such as lack of dimension due to heat shrinkage and poor appearance resulting from wrinkles during the formation processing, leaving problems of insufficient formability unsolved.

Therefore, it could be helpful to provide a polyolefin resin foam sheet and a laminate thereof having excellent flexibility and formability.

SUMMARY

We found that excellent flexibility and formability can be achieved by a polyolefin resin foam sheet containing a resin mixture as a base resin in which the resin mixture contains 0% by mass or more and 30% by mass or less of polyethylene resin, 30% by mass or more and 80% by mass or less of polypropylene resin, and 20% by mass or more and 40% by mass or less of a polyolefin elastomer, and the polyolefin resin foam sheet fulfills a range of −35% or more and 0% or less for dimensional changes under heating for 10 minutes at a temperature 20° C. higher than a maximum melting point that is the highest melting peak in a differential scanning calorimetry.

We also found that excellent flexibility and formability can be achieved by the polyolefin resin foam sheet fulfilling: 2.5 or less for a value obtained by dividing a 25% compressive strength (kPa) by a density (kg/m$^3$); and −35% or more and 0% or less for dimensional changes obtained under heating for 10 minutes at a temperature 20° C. higher than a maximum melting point that is the highest melting peak in a differential scanning calorimetry.

We thus provide:

(1) A polyolefin resin foam sheet includes a resin mixture as a base resin, the resin mixture including 0% by mass or more and 30% by mass or less of polyethylene resin, 30% by mass or more and 80% by mass or less of polypropylene resin, and 20% by mass or more and 40% by mass or less of a polyolefin elastomer, the polyolefin resin foam sheet fulfilling a range of −35% or more and 0% or less for dimensional changes in machine and transverse directions under heating for 10 minutes at a temperature 20° C. higher than a maximum melting point that is a highest melting peak in a differential scanning calorimetry.

(2) A polyolefin resin foam sheet fulfilling: 2.5 or less for a value obtained by dividing a 25% compressive strength (kPa) by a density (kg/m$^3$); and −35% or more and 0% or less for dimensional changes in machine and transverse directions obtained under heating for 10 minutes at a temperature 20° C. higher than a maximum melting point that is a highest melting peak in a differential scanning calorimetry.

(3) The polyolefin resin foam sheet according to (1) or (2), wherein the polyolefin resin foam sheet has a thickness of 1 mm or more and 5 mm or less, a density of 40 kg/m$^3$ or more and 100 kg/m$^3$ or less, and a gel fraction of 30% or more and 60% or less.

(4) The polyolefin resin foam sheet according to any one of (1) to (3), wherein the polyolefin resin foam sheet fulfills 0.5 or more and 1.5 or less for a ratio of the dimensional change in the machine direction to the dimensional change in the transverse direction under the heating for 10 minutes at the temperature 20° C. higher than the maximum melting point that is the highest melting peak in the differential scanning calorimetry.

(5) The polyolefin resin foam sheet according to any one of (1) to (4), wherein the polyolefin resin foam sheet fulfills −5% or more and 0% or less for dimensional changes in the machine and transverse directions obtained under the heating for 10 minutes at a temperature 20° C. lower than the maximum melting point that is the highest melting peak in the differential scanning calorimetry.

(6) The polyolefin resin foam sheet according to any one of (1) to (5), wherein the polyolefin resin foam sheet fulfills 0.7 or more and 1.3 or less for an average cell size ratio $BD_{MD}/BD_{TD}$ that is obtained by dividing an average cell size $BD_{MD}$ in the machine direction by an average cell size $BD_{TD}$ in the transverse direction.

(7) The polyolefin resin foam sheet according to any one of (1) to (6), wherein the polyolefin resin foam sheet fulfills 0.7 or more and 1.3 or less for a ratio of a tensile strength in the machine direction to a tensile strength in the transverse direction at 23° C.

(8) The polyolefin resin foam sheet according to any one of (1) to (7), wherein the polyolefin resin foam sheet fulfills a foam sheet thickness or more and 15 mm or less for a curl height obtained under the heating for 10 minutes at the temperature 20° C. higher than the maximum melting point that is the highest melting peak in the differential scanning calorimetry.

(9) The polyolefin resin foam sheet according to any one of (1) to (8), wherein the polyolefin resin foam sheet fulfills 1.0 or more and 1.2 or less for a surface layer gel fraction ratio calculated by dividing $GF_A$ by $GF_B$, where $GF_A$ and $GF_B$ respectively represent larger and smaller ones of gel fractions of first and fifth layers obtained by dividing the polyolefin resin foam sheet equally into five layers, which are labeled as the first to fifth layers in this order, in a thickness direction.

(10) The polyolefin resin foam sheet according to any one of (1) to (9), wherein the polyolefin resin foam sheet fulfills 1.0 or more and 1.2 or less for a surface layer average cell size ratio calculated by dividing $BD_A$ by $BD_B$, where $BD_A$ and $BD_B$ respectively represent larger and smaller ones of average cell sizes BD of first and fifth layers obtained by dividing the polyolefin resin foam sheet equally into five layers, which are labeled as the first to fifth layers in this order, in a thickness direction.

(11) The polyolefin resin foam sheet according to any one of (1) to (10), wherein the polyolefin resin foam sheet fulfills 1.0 or more and 1.5 or less for an average cell size ratio before and after heating calculated by dividing $BD_{BF}$ by $BD_{AF}$, where $BD_{BF}$ and $BD_{AF}$ respectively represent average cell sizes of the polyolefin resin foam sheet obtained before and after the heating for 10 minutes at the temperature 20° C. higher than the maximum melting point that is the highest melting peak in the differential scanning calorimetry for both machine and transverse directions.

(12) A laminate formed by laminating one or more type(s) of a surface material selected from the group consisting of sheet, film, cloth, non-woven fabric and skin, on the polyolefin resin foam sheet according to any one of (1) to (11).

We provide polyolefin resin foam sheets and laminates thereof, both of which achieve excellent flexibility and formability.

BRIEF DESCRIPTION OF THE DRAWING

The drawing illustrates measurement of the average cell size of a polyolefin resin foam sheet according to an example.

DETAILED DESCRIPTION

Our polyolefin resin foam sheets contain a resin mixture as a base resin. The resin mixture contains 0% by mass or more and 30% by mass or less of polyethylene resin, 30% by mass or more and 80% by mass or less of polypropylene resin, and 20% by mass or more and 40% by mass or less of a polyolefin elastomer.

Base Resin

The polyethylene resin refers to a resin mainly containing polyethylene such as high-density polyethylene (HDPE), low-density polyethylene (LDPE), linear low-density polyethylene (LLDPE), ethylene-ethyl acrylate copolymer (EEA), or ethylene-butyl acrylate copolymer (EBA). It is possible also to use a copolymer of an ethylene monomer and another copolymerizable monomer, as required. It is possible to use only one type of these polyethylene resins, or blend two or more types thereof. A polymerization method of the polyethylene resin is not particularly limited, and can be any of a high-pressure method, a slurry method, a solution method and a vapor phase method. A polymerization catalyst is not particularly limited, and can be Ziegler catalyst, metallocene catalyst or the like.

The polyethylene resin is not particularly limited, but preferably a resin that fulfills a density of 890 kg/m$^3$ or more and 950 kg/m$^3$ or less as well as a melt flow rate (190° C.) of 1 g/10 min or more and 15 g/10 min or less for use, particularly preferably an ethylene-α-olefin copolymer that has a density of 920 kg/m$^3$ or more and 940 kg/m$^3$ or less as well as a melt flow rate (190° C.) of 2 g/10 min or more and 10 g/10 min or less and a melting point of 100° C. or more and 130° C. or less for use.

The percentage of the polyethylene resin in the base resin is 0% by mass or more and 30% by mass or less. With 0% by mass or more and 30% by mass or less of the polyethylene resin, it is possible to provide an excellent flexibility and formability. The percentage of the polyethylene resin exceeding 30% by mass increases shrinkage during forming, causing defects such as defect size. The percentage of the polyethylene resin in the base resin is preferably 0% by mass or more and 25% by mass or less, more preferably 0% by mass or more and 20% by mass or less, still more preferably 0% by mass or more and 15% by mass or less.

The polypropylene resin is a resin mainly containing polypropylene such as homopolypropylene, ethylene-propylene random copolymer, and ethylene-propylene block copolymer. It is possible also to use a copolymer of a propylene monomer and another copolymerizable monomer, as required. It is possible to use only one type of the polypropylene resin in the polyolefin resin foam sheet, or blend two or more types thereof for use. A polymerization method of the polypropylene resin is not particularly limited, and can be any of the high-pressure method, the slurry method, the solution method and the vapor phase method. A polymerization catalyst is not particularly limited, and can be Ziegler catalyst, metallocene catalyst or the like.

The polypropylene resin is not particularly limited, but particularly preferably a random polypropylene that contains an ethylene content of 5% by mass or more and 15% by mass or less in 100% by mass of the polypropylene resin, a melting point of 135° C. or more and 160° C. or less, a melt flow rate (230° C.) of 0.5 g/10 min or more and 5.0 g/10 min or less, or a block polypropylene that fulfills an ethylene content of 1% by mass or more and 5% by mass or less in 100% by mass of the polypropylene resin, a melting point of 150° C. or more and 170° C. or less, a melt flow rate (230° C.) of 1.0 g/10 min or more and 7.0 g/10 min or less for use.

The percentage of the polypropylene resin in the base resin is 30% by mass or more and 80% by mass or less. With 30% by mass or more and 80% by mass or less of the polypropylene resin, it is possible to provide an excellent flexibility and formability. The percentage of the polypropylene resin less than 30% by mass increases shrinkage during forming, causing failure such as defect size. The percentage of the polypropylene resin exceeding 80% by mass cannot provide sufficient flexibility. The percentage of the polypropylene resin in the base resin is preferably 30% by mass or more and 70% by mass or less, more preferably 30% by mass or more and 60% by mass or less, still more preferably 30% by mass or more and 50% by mass or less.

The polyolefin elastomer is often composed of a soft segment and a hard segment, and can be a copolymer of the ethylene monomer, the propylene monomer and another copolymerizable monomer for use, as required. It is possible to use only one type of the polyolefin elastomers, or blend two or more types thereof for use. The polymerization method is not particularly limited, and can be any of the high-pressure method, the slurry method, the solution method and the vapor phase method. The polymerization catalyst is not particularly limited, and can be Ziegler catalyst, metallocene catalyst or the like. Furthermore, two or more types of polymers that serve as hard segments and soft segments can be physically mixed with each other to form a polymer alloy. Within the scope not deviating from the desired effect, it is also possible to contain an elastomer such as a polystyrene elastomer (SBC, TPS), a polyvinyl chloride elastomer (TPVC), a polyurethane elastomer (TPU), a polyester elastomer (TPEE, TPC), a polyamide elastomer (TPAE, TPA), or a polybutadiene elastomer.

The polyolefin elastomer is not particularly limited, but is preferably a polyolefin elastomer that has a melting point of 120° C. or more and 160° C. or less, a melt flow rate (230° C.) of 0.1 g/10 min or more and 40.0 g/10 min or less, and a glass transition temperature of −40° C. or less.

The percentage of the polyolefin elastomer in the base resin is 20% by mass or more and 40% by mass or less. 20% by mass or more and 40% by mass or less of the polyolefin elastomer can provide excellent flexibility and formability. The percentage of the polyolefin elastomer less than 20% by mass cannot provide sufficient flexibility. The percentage of the polyolefin elastomer exceeding 40% by mass increases shrinkage during forming, causing failure such as defect size. The percentage of the polyolefin elastomer in the base resin is preferably 20% by mass or more and 35% by mass or less, more preferably 25% by mass or more and 35% by mass or less, still more preferably 30% by mass or more and 35% by mass or less.

Foaming Agent

The polyolefin resin foam sheet is manufactured by mixing a foaming agent capable of generating gas in the base resin. Examples of its manufacturing method include: an atmospheric pressure foaming method involving adding a blowing agent by thermal decomposition as the blowing agent to the base resin, kneading while melting, and foaming by heating under atmospheric pressure; an extrusion foaming method involving degrading the blowing agent by thermal decomposition while heating in an extruder, and foaming while extruding under high pressure; a press foaming method involving degrading the blowing agent by thermal decomposition while heating in a press mold, and foaming while decreasing pressure; and an extrusion forming method involving mixing a gas or a vaporizable solvent while melting in the extruder and foaming while extruding under high pressure.

The blowing agent by thermal decomposition used herein refers to a chemical blowing agent that is degraded to release a gas during heating. Examples of the thermally de-gradable chemical blowing agent include: organic foaming agents such as azodicarbonamide, N,N'-dinitrosopentamethylenetetramine, and P,P'-oxybenzenesulfonylhydrazide; and inorganic foaming agents such as sodium bicarbonate, ammonium carbonate, ammonium bicarbonate, and calcium azide.

Each blowing agent can be used alone, two or more types thereof can be used in combination. To obtain high-magnification foams with high flexibility and formability as well as smooth surface, it is preferred to use the atmospheric pressure foaming method with use of azodicarbonamide as the blowing agent.

Cross-Linking Auxiliary Agent

For the polyolefin resin foam sheet, it is possible to use any of a cross-linked resin foam (referred to as cross-linked foam) and non-cross-linked resin foam (referred to as non-cross-linked foam) and select a resin foam appropriate to its application. The polyolefin resin foam sheet is preferably the cross-linked resin foam from the viewpoint of smooth surface of the resin foam, the excellent appearance of the laminate, and the capability to pursue design features due to difficulty in breaking during forming. There is no limitation on the method used to manufacture the cross-linked foam. Examples of the method of obtaining the cross-linked foam include: a chemical cross-linking method in which a raw material contains a cross-linking agent having a chemical structure such as silane group, peroxide, hydroxy group, amide group or ester group for a chemical cross-linking; a radiation cross-linking method in which the polyolefin resin is irradiated with radiation, $\alpha$ ray, $\beta$ ray, $\gamma$ ray or ultraviolet ray. If it is difficult to form the cross-linked structure only by irradiation with radiation, a cross-linking auxiliary agent can be contained in the base resin for producing the polyolefin resin foam sheet to obtain the cross-linked foam by the irradiation with radiation. The cross-linking auxiliary agent is not particularly limited, but is preferably a multifunctional monomer for use. Examples of the multifunctional monomer include divinylbenzene, trimethylolpropane trimethacrylate, 1,6-hexanediol dimethacrylate, 1,9-nonanediol dimethacrylate, 1,10-decanediol dimethacrylate, triallyl ester of trimellitic acid, triallyl isocyanurate, and ethylvinylbenzene. Each of these multifunctional monomers may be used alone, or two or more types thereof can be used in combination.

Other Additives

The base resin and the polyolefin resin foam sheet may contain an antioxidant, a heat stabilizer, a colorant, a flame retardant, an antistatic agent or the like, as required.

Content Ratio

In 100% by mass of the base resin of the polyolefin resin foam sheet, 0% by mass or more and 30% by mass or less of polyethylene resin, 30% by mass or more and 80% by mass or less of polypropylene resin, and 20% by mass or more and 40% by mass or less of the polyolefin elastomer are contained.

Polyolefin Resin Foam Sheet

The polyolefin resin foam sheet preferably has a closed cell structure. The form with the closed cell structure allows air to be sufficiently drawn for vacuum forming, enabling to form into complex shapes. In addition, the bubbles are preferably fine and uniform to provide smooth surfaces of the foam and the product formed from the foam.

When the polyolefin resin foam sheet is used as an automobile interior material, the thickness of the polyolefin resin foam sheet is preferably 1.0 mm or more and 5.0 mm or less. The thickness less than 1.0 mm can cause lack of shock absorbing performance at the bottom. The thickness exceeding 5.0 mm can cause poor lightweight property. The thickness is more preferably 1.0 mm or more and 4.0 mm or less, still more preferably 2.0 mm or more and 4.0 mm or less.

The apparent density of the polyolefin resin foam sheet is preferably 40 $kg/m^3$ or more and 100 $kg/m^3$ or less. The apparent density less than 40 $kg/m^3$ can cause lack of shock absorbing performance at the bottom. The thickness exceeding 100 $kg/m^3$ can lead to insufficient flexibility. The apparent density of the polyolefin resin foam sheet is more preferably 50 $kg/m^3$ or more and 100 $kg/m^3$ or less, still more preferably 50 $kg/m^3$ or more and 80 $kg/m^3$ or less.

A gel fraction refers to a percentage of a portion of the base resin that is cross-linked and polymerized, and generally corresponds to a portion of the base resin that is not plasticized at the temperature during forming. Generally, larger percentage of this portion improves heat resistance, but decreases formability. Therefore, this ratio is arbitrarily selected according to the forming method. The gel fraction of the polyolefin resin foam sheet is preferably 30% or more and 60% or less. The gel fraction less than 30% reduces the heat resistance, deteriorates the foam sheet during the form processing, making the form processing more difficult. The gel fraction exceeding 60% may reduce flexibility. The gel fraction of the polyolefin resin foam sheet is more preferably 30% or more and 55% or less, still more preferably 30% or more and 50% or less.

A gel fraction ratio $GF_A/GF_B$ at surface layers is preferably 1.0 or more and 1.2 or less. $GF_A$ and $GF_B$ respectively represent larger and smaller ones of the gel fractions of first and fifth layers. The first and fifth layers are obtained by dividing the polyolefin foam sheet equally into five layers, which are labeled as the first to fifth layers in this order, in the thickness direction. The surface layer gel fraction ratio of 1.0 or more and 1.2 or less can provide excellent formability. The surface layer gel fraction ratio exceeding 1.2 increases its curl, thereby causing failure of formation such as poor appearance resulting from defect size and wrinkle formation. The surface layer gel fraction ratio is preferably 1.0 or more and 1.1 or less.

A 25% compressive strength of the polyolefin resin foam sheet is preferably 250 kPa or less. The 25% compressive strength exceeding 250 kPa causes the difficulty in providing sufficient flexibility. The 25% compressive strength is more preferably 200 kPa or less, still more preferably 150 kPa or less.

In the polyolefin resin foam sheet, a value obtained by dividing the 25% compressive strength (kPa) by the density ($kg/m^3$) is preferably 2.5 or less. When the value obtained by dividing the 25% compressive strength (kPa) by the density ($kg/m^3$) exceeds 2.5, it is difficult to provide sufficient flexibility. The value obtained by dividing the 25% compressive strength (kPa) by the density ($kg/m^3$) is more preferably 2.3 or less, still more preferably 2.1 or less, particularly preferably 1.9 or less.

The tensile strength (in machine and transverse directions) of the polyolefin resin foam sheet is preferably 500 kPa or more at 23° C. The tensile strength (in machine and transverse directions) less than 500 kPa at 23° C. causes the risk of breaking during the formation processing, possibly not providing satisfactory formation products. The tensile strength (in machine and transverse directions) at 23° C. is more preferably 700 kPa or more, still more preferably 900 kPa or more.

For the polyolefin resin foam sheet, a tensile strength ratio obtained by dividing the tensile strength in the machine direction by the tensile strength in the transverse direction at 23° C. is preferably 0.7 or more and 1.3 or less. The tensile strength ratio less than 0.7 or more than 1.3 increases the shrinkage while heating during the formation processing, causing defect size, and possibly not providing formation products. The tensile strength ratio is more preferably 0.8 or more and 1.3 or less, still more preferably 0.8 or more and 1.2 or less, particularly preferably 0.9 or more and 1.1 or less.

A tensile strength (in machine and transverse directions) of the polyolefin resin foam sheet is preferably 500 kPa or more at −35° C. The tensile strength (in machine and transverse directions) less than 500 kPa at −35° C. causes the risk of breaking during the formation processing, possibly not providing satisfactory formation products. The tensile strength (in machine and transverse directions) at −35° C. is more preferably 700 kPa or more, still more preferably 900 kPa or more.

For the polyolefin resin foam sheet, elongation (in machine and transverse directions) at 23° C. is preferably 200% or more. The elongation (in machine and transverse directions) less than 200% at 23° C. causes breaking during the formation processing, possibly not providing satisfactory formation products. The elongation (in machine and transverse directions) at 23° C. is more preferably 250% or more, and still more preferably 300% or more.

The elongation (in machine and transverse directions) at −35° C. of the polyolefin resin foam sheet is preferably 30% or more. The elongation (in machine and transverse directions) less than 30% at −35° C. causes breaking during the formation processing, possibly not providing satisfactory formation products. The elongation (in machine and transverse directions) at −35° C. is more preferably 40% or more, still more preferably 50% or more.

The tear strength (in machine and transverse directions) at 23° C. of the polyolefin resin foam sheet is preferably 50 N/cm or more. The tear strength (in machine and transverse directions) less than 50 N/cm at 23° C. causes breaking during the formation processing, possibly not providing satisfactory formation products. The tear strength (in machine and transverse directions) at 23° C. is more preferably 60 N/cm or more, still more preferably 70 N/cm or more.

In the polyolefin resin foam sheet, a tear strength ratio, which is obtained by dividing the tear strength in the machine direction by the tear strength in the transverse direction at 23° C., is preferably 0.7 or more and 1.3 or less. The tensile strength ratio less than 0.7 or more than 1.3 increases the shrinkage while heating during the formation processing, causing defect size, and possibly not providing formation products. The tear strength ratio is more preferably 0.8 or more and 1.3 or less, still more preferably 0.8 or more and 1.2 or less, particularly preferably 0.9 or more and 1.1 or less.

In the polyolefin resin foam sheet, dimensional changes (in machine and transverse directions) under heating at 120° C. for one hour is preferably −5% or more and 0% or less. This range of the dimensional change can reduce the shrinkage during the formation processing, and thereby provide satisfactory formation product. The dimensional change in machine and transverse directions is more preferably −4% or more and 0% or less, still more preferably −3% or more and 0% or less.

In the polyolefin resin foam sheet, −5% or more and 0% or less is preferred for the dimensional change (in machine and transverse directions) under heating for 10 minutes at a temperature 20° C. lower than a maximum melting point that is the highest melting peak in the differential scanning calorimetry. The dimensional change of −5% or more and 0% or less can reduce the shrinkage during the heating formation, thereby preventing failure of formation such as defect size. The dimensional change during the heating at the temperature 20° C. lower than the maximum melting point in machine and transverse directions is more preferably −4% or more and 0% or less, still more preferably −3% or more and 0% or less.

In the polyolefin resin foam sheet, 0.5 or more and 1.5 or less is preferred for a dimensional change ratio $DC_{MD}/DC_{TD}$, which is obtained by dividing the dimensional change $DC_{MD}$ in the machine direction by the dimensional change $DC_{TD}$ in the transverse direction during the heating for 10 minutes at the temperature 20° C. lower than the maximum melting point that is the highest melting peak in the differential scanning calorimetry. This range of the dimensional change ratio $DC_{MD}/DC_{TD}$ at the temperature 20° C. lower than the maximum melting point can reduce shrinkage anisotropy, thereby provide satisfactory formation products. The dimensional change ratio $DC_{MD}/DC_{TD}$ at the temperature 20° C. lower than the maximum melting point is more preferably 0.7 or more and 1.5 or less, still more preferably 0.7 or more and 1.4 or less, particularly preferably 0.8 or more and 1.3 or less.

The polyolefin resin foam sheet fulfills −35% or more and 0% or less for the dimensional change (in machine and transverse directions) under heating for 10 minutes at a temperature 20° C. higher than the maximum melting point that is the highest melting peak in the differential scanning calorimetry. The dimensional change of −35% or more and 0% or less can reduce the shrinkage during the heating formation, thereby preventing failure of formation such as defect size. The dimensional change under the heating at the temperature 20° C. higher than the maximum melting point is preferably −33% or more, more preferably −31% or more, still more preferably −30% or more.

In the polyolefin resin foam sheet, 0.5 or more and 1.5 or less is preferred for a dimensional change ratio $DC_{MD}/DC_{TD}$, which is obtained by dividing the dimensional change $DC_{MD}$ in the machine direction by the dimensional change $DC_{TD}$ in the transverse direction under the heating for 10 minutes at the temperature 20° C. higher than the maximum melting point that is the highest melting peak in the differential scanning calorimetry. This range of the dimensional change ratio $DC_{MD}/DC_{TD}$ at the temperature 20° C. higher than the maximum melting point can reduce shrinkage anisotropy, thereby provide satisfactory formation products. The dimensional change ratio $DC_{MD}/DC_{TD}$ at the temperature 20° C. higher than the maximum melting point is more preferably 0.6 or more and 1.4 or less, still more preferably 0.7 or more and 1.3 or less.

In the polyolefin resin foam sheet, a foam sheet thickness or more and 15 mm or less is preferred for a curl height under the heating for 10 minutes at the temperature 20° C. higher than the maximum melting point that is the highest melting peak in the differential scanning calorimetry. When the curl height is set to the foam sheet thickness or more and 15 mm or less, it is possible to provide excellent formability. The curl height exceeding 15 mm causes failure of formation such as poor appearance resulting from defect size and wrinkling. The curl height is preferred to be small, and the thickness of the foam sheet is practically a lower limit. The curl height of the polyolefin resin foam sheet is more preferably the foam sheet thickness or more and 14 mm or less, still more preferably the foam sheet thickness or more and 13 mm or less, particularly preferably the foam sheet thickness or more and 12 mm or less.

The curl height of the polyolefin resin foam sheet can be reduced by decreasing the surface layer gel fraction ratio of the polyolefin resin foam sheet. The surface layer gel fraction ratio refers to the value calculated by $GF_A/GF_B$. $GF_A$ and $GF_B$ respectively represent larger and smaller ones of the gel fractions of first and fifth layers. The first and fifth layers are surface layers obtained by dividing the polyolefin resin foam sheet equally into five layers, which are labeled as the first to fifth layers in this order, in the thickness direction.

The curl height of the polyolefin resin foam sheet can be reduced by decreasing an average cell size ratio of the surface layers of the polyolefin resin foam sheet. The average cell size ratio of the surface layers is a value calculated by $BD_A/BD_B$, where $BD_A$ and $BD_B$ respectively represent larger and smaller ones of the average cell sizes of first and fifth layers.

Furthermore, the percentages of the polyethylene resin and the polyolefin resin in the base resin can be reduced within such a range as not to impair the flexibility to bring an advantageous effect of reducing the curl height. The curl height can be lowered by control-ling any one or more of the resin composition, the gel fraction ratio of the surface layer, and the average cell size of the surface layer. It is preferred to control more than one thereof.

The average cell size (in machine and transverse directions) of the polyolefin resin foam sheet is preferably 50 μm or more and 500 μm or less. The average cell size less than 50 μm may decrease heat resistance. The average cell size exceeding 500 μm may lose the surface smoothness, and generate bumps during the formation. The average cell size of the polyolefin resin foam sheet is more preferably 100 μm or more and 500 μm or less, still more preferably 200 μm or more and 500 μm or less.

0.7 or more and 1.3 or less is preferred for an average cell size ratio $BD_{MD}/BD_{TD}$, which is obtained by dividing the average cell size $BD_{MD}$ in the machine direction by the average cell size $BD_{TD}$ in the transverse direction of the polyolefin resin foam sheet. The average cell size ratio less than 0.7 or more than 1.3 increases the shrinkage caused by heating during the formation processing, causing defect size, possibly not providing the formation product. The average cell size ratio $BD_{MD}/BD_{TD}$ of the polyolefin resin foam sheet is more preferably 0.8 or more and 1.3 or less, still more preferably 0.8 or more and 1.2 or less, particularly preferably 0.9 or more and 1.1 or less. When stretching stress is applied in the machine direction during the production process, flat cells are generated in the machine direction due to residual stress. When heated in the foaming process, the cells formed by the decomposition of the blowing agent try to round. But, when the stress is applied, the cells are flattened. Since the stretching stress can be determined during the production based on the degree of flattening of cells, the foam with a small average cell size ratio $BD_{MD}/BD_{TD}$ has a small heating dimensional shrinkage and superior formability.

The average cell size ratio of the surface layer of the polyolefin resin foam sheet is preferably 1.0 or more and 1.2 or less. The average cell size ratio of the surface layer refers to the value calculated by $BD_A/BD_B$. $BD_A$ and $BD_B$ respectively represent larger and smaller ones of the average cell sizes BD of first and fifth layers obtained by dividing the polyolefin resin foam sheet equally into five layers, which are labeled as the first to fifth layers in this order, in the thickness direction. The average cell size ratio $BD_A/BD_B$ of the surface layers of 1.0 or more and 1.2 or less can reduce curl of the form, and prevent failure of formation such as poor appearance resulting from defect size and wrinkling. The average cell size ratio $BD_A/BD_B$ of the surface layers is more preferably 1.0 or more and 1.1 or less, still more preferably 1.0.

In the polyolefin resin foam sheet, 1.0 or more and 1.5 or less is preferred for the ratio $BD_{BF}/BD_{AF}$ (in machine and transverse directions) of the average cell size $BD_{BF}$ determined before the heating to the average cell size $BD_{AF}$ determined after the heating for 10 minutes at the temperature 20° C. higher than the maximum melting point that is the highest melting peak in the differential scanning calorimetry. The average cell size ratio $BD_{BF}/BD_{AF}$ before and after the heating of 1.0 or more and 1.5 or less can provide excellent formability. The average cell size ratio $BD_{BF}/BD_{AF}$ before and after the heating exceeding 1.5 may cause failure of formation such as defect size. The average cell size ratio $BD_{BF}/BD_{AF}$ before and after the heating of the polyolefin resin foam sheet is more preferably 1.0 or more and 1.4 or less, still more preferably 1.0 or more and 1.3 or less, particularly preferably 1.0 or more and 1.2 or less.

Laminate

Our laminates are formed by laminating the polyolefin resin foam sheet mentioned above on one or more type(s) of a surface material(s) selected from sheet, film, cloth, skin and the like. The laminating of the surface material on the polyolefin resin foam sheet enables it to provide high-quality appearance resulting from better designability. The material of the surface material is not particularly limited. Examples of the material of the surface material include sheets and films of thermoplastic polyolefin elastomers (TPO) containing an elastomer component such as polyethylene, polypropylene, ethylene-vinyl acetate copolymer (EVA), ethylene-ethyl acrylate copolymer (EEA), ethylene-butyl acrylate copolymer (EBA) or ethylene-propylene rubber, and sheets, films, cloth, non-woven fabrics and skins of vinyl resins such as polyvinyl chloride and polyvinylidene chloride, polyurethane resins, polystyrene resins, polyether resins, polyamide resins, and copolymers composed of a monomer copolymerizable with the resins listed above. Each of the surface materials can be used alone, or two or more types thereof can be used in combination.

Method of Producing Polyolefin Resin Foam Sheet

The polyolefin resin foam sheet can be produced through a step of forming the base resin into a sheet shape to obtain a foamable sheet, a step of cross-linking the foamable sheet, and a step of heating the cross-linked foamable sheet resulting in foaming to obtain the foam sheet. The method of producing the polyolefin resin foam sheet is described below, with reference to an example of the normal-pressure foaming method using the blowing agent by thermal decomposition as the blowing agent.

The step of obtaining the foamable sheet involves mixing homogeneously the blowing agent by thermal decomposition with the base resin composed of polyethylene resin, polypropylene resin, the olefin elastomer and the like using a mixing tool such as Henschel mixer or tumbler, then melt-kneading homogeneously at a temperature lower than the decomposition temperature of the blowing agent by thermal decomposition using a melt-kneading tool such as an extruder or pressure kneader, and then forming the resultant product into a sheet shape using T-shaped ferrule. To form into the sheet shape, it is preferable to form while reducing a draw down ratio, that is, reducing the stretching stress. The draw down ratio refers to a number calculated as a ratio of a sheet thickness to a gap at the tip of the ferrule. The smaller number indicates that the foamable sheet extruded from the ferrule is not stretched. The small draw down ratio can reduce the distortion in the machine direction of the foamable sheet as well as the residual distortion of the foamable sheet, thereby reducing shrinkage during the thermoforming, i.e., preventing defect size and improving formability. Generally, the foaming temperature in the step of obtaining the foam sheet is higher than the forming temperature in the step of obtaining the foam sheet. So, if the draw down ratio is large and the foam sheet remains highly distorted, the strain relaxation occurs in the early stages of foaming and the sheet is shrunk in the machine direction. The machine direction stretch ratio is calculated by dividing a take-up speed by an unwinding speed, but the actual unwinding speed is slower due to the aforementioned shrinkage, resulting in a further stretched state in the machine direction. In addition, if the shrinkage in the machine direction due to strain relaxation is large, the foam state is not stable, making it difficult to reduce the machine direction stretch ratio on the setting. It is preferred to increase so-called air gap, which represents a distance between the ferrule and a first nip roll to form the sheet discharged from the ferrule, although it depends on the amount of resin to be discharged and the thickness and width of the sheet. The increased air gap enables it to relax the orientation of the resin after the ferrule. This allows for sufficient distance to reduce distortion of the foam sheet as long as drawdown and neck-in are acceptable, thereby reducing shrinkage of the foam sheet. It is also preferable to set the temperature for forming the sheet at a higher temperature within such a range as not to decompose the blowing agent by thermal decomposition to reduce the distortion. The temperature of the base resin discharged from the ferrule is preferably within a range of 165° C. or more and 190° C. or less. Furthermore, it is important to reduce the tension to such an extent as not to collapse the wound sheet when winding up the formed sheet. It is possible to add an antioxidant, a heat stabilizer, a cross-linking auxiliary agent or the like, as required when the base resin is mixed with the blowing agent by thermal decomposition.

The step of cross-linking the foamable sheet involves subjecting the formed foamable sheet to ionizing radiation to cross-link the foamable sheet. Examples of the ionizing radiation include radiation, α-ray, β-ray, γ-ray, and X-ray. The radiation is preferred for productivity.

The step of obtaining the foam sheet involves foaming the cross-linked foamable sheet by heating to obtain the polyolefin resin foam sheet. Specifically, the polyolefin resin foam sheet can be obtained by softening the base resin by heating while raising the temperature up to the decomposition temperature of the blowing agent by thermal decomposition or more to foam the base resin with the gas generated by the decomposition of the blowing agent by thermal decomposition. Examples of heating methods include floating on a salt bath as a heat transfer medium, and throwing the product into an atmosphere such as hot air. The method of floating on the salt bath is preferred because it can decrease stress applied during foaming as much as possible to reduce the distortion, and thereby improve heating dimensional shrinkage, that is formability, while the polyolefin resin foam sheet is formed by heating. The cross-linked foamable sheet may also be stretched in the machine direction and/or transverse direction. An implementation method for productivity is to continuously feed the rolled cross-linked foam sheets into a high-temperature salt bath and wind them up as a rolled product. At this time, the machine direction stretch ratio, calculated by dividing the take-up speed by the unwind speed is preferably 2.0 or more and 3.0 or less. The machine direction stretch ratio less than 2.0 may cause meandering sheet during the foaming step, thereby possibly not providing satisfactory foam sheets. The machine direction stretch ratio exceeding 3.0 may increase the stress applied on the form sheet, leaving the distortion of the foam sheet, and thereby increasing the dimensional shrinkage during the forming step. That is, it may generate defect size, possibly making the formation impossible. The machine direction stretch ratio is preferably 2.2 or more and 2.8 or less, more preferably 2.2 or more and 2.7 or less, and still more preferably 2.3 or more and 2.7 or less. Preheating is preferred before heating up to the decomposition temperature of the blowing agent or more to reduce the distortion of the cross-linked foamable sheet and stabilize the foam state. The temperature for the preheating is preferably equal to or less than the highest melting peak temperature and is equal to or greater than a temperature 30° C. lower than the lowest melting peak temperature. The melting peak temperatures are obtained by the differential scanning calorimetry measured for the resin mixture containing polyethylene resin, polypropylene resin and the polyolefin elastomer. The preheating of the foamable sheet in this temperature range makes it possible to reduce sheet distortion, and thereby reduce the machine direction stretch ratio in the foaming step. Furthermore, the heating temperature during the foaming is preferably set to be different at the first half and the second half of the foaming step, rather than remaining unchanged, to slow down the foaming to reduce the machine direction stretch ratio. From the viewpoint of reducing the shrinkage of the foam in the machine direction, it is preferable to reduce the roll rotation resistance and the like, and decrease the machine direction stretch ratio in the conveying roll after the foam is cooled in the foaming step until winding. The transverse direction stretch ratio, which is obtained by dividing a transverse direction length of the resin foam sheet by a transverse direction length of the resin foamable sheet before foaming, is preferably equal to the machine direction stretch ratio.

Method of Manufacturing Laminate

The method of laminating the surface material on the polyolefin resin foam sheet to form the laminate is not particularly limited, but can be extrusion lamination, adhesive lamination, thermal lamination, hot-melt method, or the like.

Formation of Polyolefin Resin Foam Sheet or Laminate

The method of forming the polyolefin resin foam sheet or the laminate is not particularly limited, but can be a well-known method such as extrusion molding, vacuum molding, stamping molding, blow molding or the like. The formed products obtained by these methods may be secondarily processed into certain shapes as required by heat welding, vibration welding, ultrasonic welding, laser welding or the like.

Example

Physical Property Evaluation

Various physical properties were measured according to the following methods for polyolefin resin foam sheets that were cured at a temperature of 23° C. and a humidity of 50% for at least four days after foaming. A machine direction represents a longitudinal direction. A transverse direction represents a width direction. If the machine direction and transverse direction cannot be distinguished from each other, a direction of longest diameter of a cell is considered as the machine direction while a direction perpendicular to the longest diameter of the cell is considered as the transverse direction.

If there is no description of the physical property range limited to the machine direction or transverse direction, both the machine direction and transverse direction need to fulfill the range conditions. With respect to the physical property values, the obtained values are rounded up or down to the effective digits written in the description.

(1) Thickness (Mm)

The thickness of the polyolefin resin foam sheet was measured in accordance with ISO 1923:1981, "Cellular plastics and rubbers-Determination of linear dimensions." Specifically, the resin foam sheet was placed on a flat table, and then a dial gauge with a circular gauge head having an area of 10 $cm^2$ was brought into contact with the resin foam sheet surface at a constant pressure of 10 g/10 $cm^2$.

(2) Apparent Density ($Kg/m^3$)

The apparent density of the polyolefin resin foam sheet was measured in accordance with JIS K6767:1999 "Cellular plastics-Polyethylene-Methods of test." Specifically, the thickness and the mass were measured for a 10 cm square test piece (polyolefin resin foam sheet), and the apparent density was calculated using the following formula:

Density ($kg/m^3$)=Mass of test piece (kg)/[Area of test piece 0.0001 ($m^2$)×Thickness of test piece (m)].

(3) Foaming Ratio ($Cm^3/g$)

The foaming ratio of the polyolefin resin foam sheet was obtained as the reciprocal of the apparent density that was measured by JIS K6767:1999 "Cellular plastics-Polyethylene-Methods of test."

(4) Gel Fraction and Gel Fraction Ratio of Surface Layer (%)

The polyolefin resin foam sheet was cut into approximately 0.5 mm squares. Then, approximately 100 mg of the cut polyolefin foam sheet was weighed out in 0.1 mg increments. The weighed polyolefin resin foam sheet was soaked into 200 mL of tetralin at a temperature of 130° C. for 3 hours, and then naturally filtered through a 100-mesh stainless steel wire mesh. The insoluble content on the mesh was dried at 120° C. for one hour with a hot air oven. Next, the insoluble content was then cooled in a desiccator containing dried silica gel for 10 minutes. The mass of this insoluble content was determined in 0.1 mg increments, and the gel fraction was calculated as a percentage according to the following formula:

Gel fraction (%)=[Mass of insoluble content (mg)/Mass of weighed foam (mg)]×100.

The gel fraction of the surface layer was calculated as follows. The polyolefin resin foam sheet was divided equally into five layers, which were labeled as first to fifth layers in this order, in thickness direction using a slicer (NP-120RS manufactured by Nippy kikai Co., Ltd.). The gel fractions were determined for the first and fifth layers of the foam in the same way as the gel fraction measurement described above. The gel fraction ratio of the surface layers was determined based on the value calculated by $GF_A/GF_B$, in which $GF_A$ and $GF_B$ respectively represent the larger and smaller ones of the gel fractions of the first and fifth layers.

(5) 25% Compressive Strength (kPa)

The 25% compressive strength of the polyolefin resin foam sheet was measured in accordance with JIS K6767:1999 "Cellular plastics-Polyethylene-Methods of test." Specifically, the polyolefin resin foam sheet was cut into 50 mm×50 mm, then the polyolefin resin foam sheets cut were laminated so that the thickness was 20 mm or more and 30 mm or less. Then, an initial thickness was measured. The laminated sample was placed on a flat plate, compressed at a rate of 10 mm/min to 25% of the initial thickness, then held while compressed. Then, the load after 20 seconds was measured and calculated using the following formula:

25% compressive strength (kPa)=load at 20 seconds after 25% compression (N)/0.0025 ($m^2$)/1000.

(6) Tensile Strength (kPa)/Elongation (%)

Tensile strength and elongation of the polyolefin resin foam sheet were measured in accordance with JIS K6767:1999 "Cellular plastics-Polyethylene-Methods of test." The polyolefin resin foam sheet was punched out with a dumbbell die such that the machine and transverse directions were the longitudinal directions for preparation of the test piece.

The test piece was placed in a thermostatic oven at 23° C. for 5 minutes. Then, the test piece was subjected to a uniaxial tensile test at 23° C. The maximum value of the strength was determined as the 23° C. tensile strength. The elongation at break was determined as the 23° C. elongation. The tensile strength ratio $TS_{MC}/TS_{TA}$ was calculated by dividing the tensile strength $TS_{MC}$ in the machine direction by the tensile strength $TS_{TA}$ in the transverse direction. The elongation $TE_{MD}/TE_{TD}$ was calculated by dividing the elongation $TE_{MD}$ in the machine direction by the elongation $TE_{TD}$ in the transverse direction.

In addition, the test piece was left to stand in a thermostatic oven at −35° C. for 5 minutes, and then subjected to the uniaxial tensile test at −35° C. The maximum value of the strength was determined as −35° C. tensile strength. The elongation at break was determined as the −35° C. elongation.

(7) Tear Strength (N/Cm)

The tear strength of the polyolefin resin foam sheet was measured in accordance with JIS K6767:1999 "Cellular plastics-Polyethylene-Methods of test." The polyolefin resin foam sheet was punched out with a die such that the machine and transverse directions were the longitudinal directions for preparation of the test piece. The machine direction represents the flow direction and the transverse direction represents the width direction. The test piece was left to stand in the thermostatic oven at 23° C. for 5 minutes, and then subjected to the tear test at 23° C. The maximum load at the time of breaking was defined as the tear strength. The tear strength ratio $TeS_{MD}/TeS_{TD}$ was calculated by dividing the tear strength $TeS_{MD}$ in the machine direction by the tear strength $TeS_{TD}$ in the transverse direction.

(8) Dimensional Change (%)

The dimensional change of the polyolefin resin foam sheet was measured by the method equivalent to JIS K7133:1999 "Plastics-Film and sheeting-Determination of dimensional change on heating." Specifically, the center of the polyolefin resin foam sheet in the transverse direction was punched into a 120×120 mm square so that the two sides were parallel to the machine direction for preparation of the test piece. Marked lines were drawn on the test piece in the machine and transverse directions, and lengths were measured in 0.1 mm increments using calipers. Next, a metallic container containing a kaolin bed was placed in an oven at 120° C. to keep the kaolin bed at 120° C. Kaolin was sprinkled on the test piece. Then, the test piece was placed flat on the kaolin bed, and heated for 1 hour at 120° C. After the heating, the test piece was cooled down at a temperature of 23° C. and a humidity of 50% for 30 minutes or more. Then, the lengths of the marked lines in the machine and transverse directions after the test were measured in 0.1 mm increments using the caliper. The dimensional changes in the machine and transverse directions were calculated by the following formulae:

Machine direction dimensional change ($DC_{MD}$)=[(Machine direction marked line length after heating)−(Machine direction marked line length before heating)]/(Machine direction marked line length before heating)×100

Transverse direction dimensional change ($DC_{TD}$)=[(Transverse direction marked line length after heating)−(Transverse direction marked line length before heating)]/(Transverse direction marked line length before heating)×100.

A "temperature 20° C. higher than the maximum melting point" and a "temperature 20° C. lower than the maximum melting point" were also measured in the same way, except that the heating temperature was changed while the heating time was changed from 1 hour to 10 minutes. The dimensional change ratio $DC_{MD}/DC_{TD}$ was calculated by dividing the dimensional change $DC_{MD}$ in the machine direction by the dimensional change DCT D in the transverse direction.

(9) Average Cell Size (μm), Average Cell Size Ratio, Average Cell Size Ratio of Surface Layer, Average Cell Size Ratio Before and After Heating The average cell size of the polyolefin resin foam sheet was determined by measuring lengths in the machine and transverse directions and then calculating. To measure the average cell size, the polyolefin resin foam sheet was first cut with a razor blade to form a surface with an open cell cross-section parallel to the machine direction. Then, the cross-section was photographed with a scanning electron microscope (S-3000N manufactured by Hitachi High-Tech Corporation) at a certain image magnification. The resulting image is printed on A4 paper. FIG. 1 illustrates the measurement of the average cell size of the polyolefin resin foam sheet. As illustrated in FIG. 1, an arbitrary straight line was drawn in the middle of the thickness direction to pass on at least 20 cells in the machine direction. The average string length was calculated from the length of the straight line and the number of cells on which this line passes. The arbitrary straight line described above was drawn to pass on the cells, rather than on the contact points between adjacent cells, as much as possible. When the above straight line passes on the contact points between the cells, the number of cells was counted as 2 at the corresponding point on which the straight line passes:

Average string length (μ)=length of straight line (μm)/number of cells (pcs).

From the calculated average string length, the average cell size $BD_{MD}$ in the machine direction was calculated using the following formula:

Average cell size (μm)=Average string length (μm)/0.62.

In the transverse direction, the average cell size $BD_{TD}$ was calculated in the same way as in the machine direction.

The average cell size ratio $BD_{MD}/BD_{TD}$ was determined by dividing the average cell size $BD_{MD}$ in the machine direction by the average cell size $BD_{TD}$ in the transverse direction.

The average cell size ratio of the surface layer of the polyolefin resin foam sheet was calculated as follows. The polyolefin resin foam sheet was divided equally into five layers, which were labeled as first to fifth layers in this order, in the thickness direction using the slicer. For the first layer of the foam, the straight line was drawn in the middle of the thickness direction in the same way as in the aforementioned average cell size measurement. Then, the average cell sizes in the machine and transverse directions were calculated. The average cell size was determined as an average of these calculated values for the first layer. For the fifth layer of the foam, the average cell sizes in the machine and transverse directions were calculated in the same way as in the aforementioned average cell size measurement. The average cell size was determined as an average of these calculated values for the fifth layer. The average cell size ratio of the surface layers was determined from $BD_A/BD_B$. $BD_A$ and $BD_B$ respectively represent larger and smaller ones of the average cell sizes at the first and fifth layers.

The average cell size ratio before and after heating was calculated as follows. The metal container containing the kaolin bed was placed in the oven set to the temperature 20° C. higher than the maximum melting point, which is the highest melting peak in the differential scanning calorimetry. Kaolin was sprinkled on the polyolefin resin foam sheet that were cured for at least four days at a temperature of 23° C. and a humidity of 50%. The sheet was placed flat on the kaolin bed, and then heated for 10 minutes at the temperature 20° C. higher than the maximum melting point, the highest melting peak in the differential scanning calorimetry. After heating, the sheet was cooled down for 30 minutes or more at a temperature of 23° C. and a humidity of 50%. For the polyolefin resin foam sheet obtained, the straight line was drawn in the middle of the thickness direction and then the average cell size was determined for each of machine and transverse directions in the same way as in the aforementioned average cell size measurement. The determined average cell size represents the average cell size $BD_{AF}$ after the heating. For each of the machine and transverse directions, the average cell size ratio $BD_{BF}/BD_{AF}$ before and after heating was determined by dividing the average cell size $BD_{BF}$ before heating by the average cell size $BD_{AF}$ after heating.

(10) Maximum Melting Point (° C.)

Differential scanning calorimeter (DSC, RDC220-Robot DSC manufactured by Seiko instruments Inc.) was used for measurement. 5 mg of the polyolefin resin foam sheet was held under a nitrogen atmosphere at temperatures that were elevated from room temperature to 200° C. at a rate of 10° C./minute and then held at 200° C. for 5 minutes ($1^{st}$ run). Then, the temperature was decreased down to 0° C. at a rate of 10° C./minute, and then increased up to 200° C. at a rate of 10° C./minute ($2^{nd}$ run). The top value of the melting peak (endothermic peak) on the hottest side of the $2^{nd}$ run was read out, and used as the maximum melting point.

(11) Curl Height (Mm)

It was measured in length using the test piece after the measurement of the dimensional change at the temperature 20° C. higher than the maximum melting point. The test piece was placed on the metal plate to maximize the contact area between the foam test piece and the metal plate. The curl height was determined as the maximum length between the top and bottom of the foam sheet in a perpendicular direction of the metal plate.

(12) Formation Evaluation

The polyolefin resin foam sheet was cut in parallel to the machine direction or the transverse direction to make 200 mm square test pieces. For both of the two sides parallel to the machine direction, areas 10 mm spaced away from both edges were evenly clamped for fixture. The form sheet was heated for 50 to 70 seconds with an infrared heater such that the surface temperatures at both sides of the foam sheet reached 20° C. higher than the maximum melting point, which is the highest melting peak in the differential scanning calorimetry, and then vacuum-formed in a metal die with a 150 mm square vacuum hole with a depth of 20 mm. The metal die was set to be positioned in the middle of the foam sheet surface. The position was adjusted so that the foam sheet was aligned to be parallel to sides of the metal die. The test piece with two clamped sides parallel to the transverse direction was formed in the same way. The formation was evaluated by visual inspection, using the following criteria in five levels. Larger values of the formation evaluation indicate better formability. The formation evaluation of 3 to 5 is considered acceptable. It is necessary to meet the following evaluation criteria for both machine and transverse directions:

- Formation evaluation 1: Defect size. Very poor appearance resulting from folding and wrinkling at the edge of the foam sheet.
- Formation evaluation 2: Defect size. Poor appearance resulting from folding and wrinkling at the edge of the foam sheet.
- Formation evaluation 3: No defect size. Folding and light wrinkling confirmed at the edge of the foam sheet.
- Formation evaluation 4: No defect size. Light wrinkling confirmed.
- Formation evaluation 5: No defect size. Satisfactory appearance confirmed.

Resin and Additive

The following resins and additives were used in Examples and Comparative Examples:

- Polyethylene resin: Product name “Novatec (registered trademark) UJ960 (MFR: 5 g/10 min, density: 935 kg/m$^3$)” manufactured by Nippon Polyethylene Co.
- Polypropylene resin: Product name “PB222A (MFR 0.75 g/10 min, density 900 kg/m$^3$)” manufactured by Sun Aroma
- Polyolefin elastomer: Product name “Infuse (registered trademark) 9107 (MFR: 1 g/10 min, density: 866 kg/m$^3$)” manufactured by DOW
- Blowing agent: Azodicarbonamide (product name “VINIHOL (registered trademark) AC #R” manufactured by Eiwa Chemical Industries)
- Cross-linking auxiliary agent: 55% divinylbenzene (Wako Pure Chemical Industries, Ltd.)
- Antioxidant: Product name “IRGANOX (registered trademark) 1010” manufactured by BASF.

Examples 1 to 10, Comparative Examples 1 and 4 to 6

To 100 parts by mass of the base resin, which was obtained by mixing polyethylene resin with polypropylene resin and polyolefin elastomer in the proportions listed in Table 1, foaming agent, cross-linking auxiliary agent and antioxidant were added according to the addition amounts listed in Table 1, and the mixture was fed into a Henschel mixer for grinding and mixing.

The resulting mixture is fed into a twin-screw extruder for melt-kneading at a resin temperature of 160° C. or more and 180° C. or less, formed into a sheet with a draw down ratio of 1.4 and a thickness of 1.4 mm using a T-die, and rolled to obtain the foamable sheet. However, to adjust the thickness of the foam, the thickness of the foamable sheet was 2.0 mm for Example 3, 1.3 mm for Example 4, and 1.6 mm for Example 5.

The resulting foamable sheet was irradiated from one side with 90-kGy radiation at an acceleration voltage of 800 kV to obtain a cross-linked foamable sheet. However, to adjust the gel fraction of the foam, the irradiation dose was set to 60 kGy for Example 6 and 140 kGy for Example 7.

The rolled cross-linked foamable sheet was preheated in warm water at 80° C. or more and 95° C. or less, then floated to be heated on a salt bath in which the temperature was controlled continuously to 220° C. or more and 229° C. or less in the first half, and 230° C. or more and 235° C. or less in the second half, while heated with an infrared heater from the top thereof, to provide the polyolefin resin foam sheet. The machine direction stretch ratio was adjusted to 2.7. The machine direction stretch ratio was obtained by dividing the take-up speed at which the film was taken out from the salt bath after foaming by the unwinding speed at which the film was supplied to the salt bath. However, to adjust the foam thickness, the machine direction stretch ratio was set to 3.0 for Example 4 and 2.3 for Example 5. The resulting foam sheet is then cooled and washed with water at 50° C., and then dried in warm air.

The physical properties of the resulting polyolefin foam sheets are listed in Tables 1 through 3.

Example 11

It was produced in the same way as in Example 1, except that the draw down ratio was set to 1.6. The physical properties of the resulting polyolefin resin foam sheet are listed in Table 2.

Example 12

To 100 parts by mass of the base resin, which was obtained by mixing polyethylene resin with polypropylene resin and polyolefin elastomer in the proportions listed in Table 1, foaming agent, cross-linking auxiliary agent and antioxidant were added according to the addition amounts listed in Table 1, and the mixture was fed into a Henschel mixer for grinding and mixing.

The resulting mixture is fed into a twin-screw extruder for melt-kneading at a resin temperature of 160° C. or more and 180° C. or less, formed into a sheet with a draw down ratio of 1.4 and a thickness of 1.4 mm using a T-die, and rolled to obtain the foamable sheet.

The resulting foamable sheet was irradiated from one side with 90-kGy radiation at an acceleration voltage of 800 kV to obtain a cross-linked foamable sheet.

The rolled cross-linked foamable sheet was cut into 10 cm squares and floated to be heated on the salt bath adjusted to 230° C. or more and 240° C. or less, while a salt heat medium at the above temperature was poured from the top for heating both sides to the polypropylene resin foam sheet. The resulting foam sheet is then cooled and washed with water at 50° C., and then dried in warm air.

The physical properties of the resulting polyolefin resin foam sheet are listed in Table 2.

Example 13

It was produced in the same way as in Example 1, except that the draw down ratio was set to 1.0, the thickness of the foamable sheet was set to 1.2 mm, and the machine direction stretch ratio was adjusted to 2.0. The physical properties of the resulting polyolefin resin foam sheet are listed in Table 2.

Example 14

It was produced in the same way as in Example 1, except that the draw down ratio was set to 1.0, the thickness of the foamable sheet was set to 1.6 mm, and the machine direction stretch ratio was adjusted to 3.1. The physical properties of the resulting polyolefin resin foam sheet are listed in Table 2.

Example 15

It was produced in the same way as in Example 1, except that the draw down ratio was set to 1.6, the thickness of the foamable sheet was set to 1.2 mm, and the machine direction stretch ratio was adjusted to 2.0. The physical properties of the resulting polyolefin resin foam sheet are listed in Table 2.

Example 16

The foam was produced according to Example 6 described in Japanese Patent Application Laid-open No. 2015-187232, except that the draw down ratio was adjusted to 1.0 and the machine direction stretch ratio was adjusted to 2.7. The physical properties of the resulting polyolefin resin foam sheet are listed in Table 2.

To 100 parts by mass of base resin made by mixing 33 parts by mass of olefin elastomer resin (DOW, product name: "Infuse (registered trademark) 9107 (melt flow rate: 1.0 g/10 min)") and 67 parts by mass of polypropylene resin (Sunoco Chemicals, product name: "TR3020F (melt flow rate: 2.1 g/10 min)"), 6.5 parts by mass of blowing agent (Eiwa Chemical Industries, product name: "VINIHOL (registered trademark) AC #R"), 1 part by mass of antioxidant (BASF, product name: "IRGANOX (registered trademark) 1010") and 4 parts by mass of cross-linking auxiliary agent (Wako Pure Chemical Industries, 80% divinylbenzene) were added, and then mixed using a Henschel mixer. The mixture was melt-extruded using an extruder and a T-die at a temperature of 160° C. and a draw down ratio of 1.0 to produce the polyolefin resin sheet (foamable sheet) with a thickness of 1.3 mm.

One surface of the resulting polyolefin resin sheet was continuously irradiated with radiation at an acceleration voltage of 700 kV, a current of 65 mA, and an irradiation speed of 14.4 m/min to obtain the cross-linked foamable sheet.

The rolled cross-linked foamable sheet was floated on the salt bath at 220° C. while heated from the top with the infrared heater and foamed to adjust the machine direction stretch ratio to 2.7 for foaming. It was cooled with water at 60° C. to provide the polyolefin resin foam sheet.

Example 17

The foam was produced according to Example 6 described in Japanese Patent Application Laid-open 2015-187232, except that the draw down ratio was adjusted to 1.0. The physical properties of the resulting polyolefin resin foam sheet are listed in Table 2.

It was produced in the same way as in Example 16, except that the machine direction stretch ratio was adjusted to 3.1.

Example 18

The foam was produced according to Example 7 described in Japanese Patent Application Laid-open 2015-187232, except that the machine direction stretch ratio was adjusted to 2.7. The physical properties of the resulting polyolefin resin foam sheet are listed in Table 2.

It was produced in the same way as in Example 16, except that the ratio of olefin elastomer resin in the base resin was changed to 40 parts by mass and that of polypropylene resin in the base resin was changed to 60 parts by mass, and the draw down ratio was adjusted to 1.6.

Comparative Examples 2 and 3

The foamable sheet was produced in the same way as in Example 1, except that the thickness of the foamable sheet was set to 1.6 mm and the machine direction stretch ratio was adjusted to 3.1. The physical properties of the resulting polyolefin resin foam sheet are listed in Table 3.

Comparative Example 7

It was produced in the same way as in Example 1, except that the draw down ratio was set to 1.6, the thickness of the foamable sheet was set to 1.6 mm, and the machine direction stretch ratio was adjusted to 3.1. The physical properties of the resulting polyolefin resin foam sheet are listed in Table 3.

Comparative Example 8

It was produced in the same way as in Example 1, except that the acceleration voltage was set to 1000 kV, the thickness of the foamable sheet was set to 1.6 mm, and the machine direction stretch ratio was adjusted to 3.1. The physical properties of the resulting polyolefin resin foam sheet are listed in Table 3.

Comparative Example 9

The foam was produced according to Example 6 described in Japanese Patent Application Laid-open 2015-187232. The physical properties of the resulting polyolefin resin foam sheet are listed in Table 3.

To 100 parts by mass of base resin made by mixing 33 parts by mass of olefin elastomer resin (DOW, product name: "Infuse (registered trademark) 9107 (melt flow rate: 1.0 g/10 min)") and 67 parts by mass of polypropylene resin (Sunoco Chemicals, product name: "TR3020F (melt flow rate: 2.1 g/10 min)"), 6.5 parts by mass of blowing agent (Eiwa Chemical Industries, product name: "VINIHOL (registered trademark) AC #R"), 1 part by mass of antioxidant (BASF, product name: "IRGANOX (registered trademark) 1010") and 4 parts by mass of cross-linking auxiliary agent (Wako Pure Chemical Industries, 80% divinylbenzene) were added, and then mixed using a Henschel mixer. The mixture was melt-extruded using an extruder and a T-die at a temperature of 160° C. and a draw down ratio of 1.6 to produce the polyolefin resin sheet (foamable sheet) with a thickness of 1.3 mm.

One surface of the resulting polyolefin resin sheet was continuously irradiated with radiation at an acceleration voltage of 700 kV, a current of 65 mA, and an irradiation speed of 14.4 m/min to obtain the cross-linked foamable sheet.

The rolled cross-linked foamable sheet was floated on the salt bath at 220° C. while heated from the top with the infrared heater and foamed to adjust the machine direction stretch ratio to 3.1 for foaming. It was cooled with water at 60° C. to provide the polyolefin resin foam sheet.

The heating shrinkage of the resulting polyolefin foam sheet was measured by the method described in Japanese Patent Application Laid-open No. 2015-187232. The measurement revealed that the heating shrinkage under 140° C. condition was 6.9%.

Comparative Example 10

The foam was produced according to Example 7 described in Japanese Patent Application Laid-open 2015-187232. The physical properties of the resulting polyolefin resin foam sheet are listed in Table 3.

It was produced in the same way as in Comparative Example 9, except that the blending ratio of the base resin was changed to 40 parts by mass of olefin elastomer resin and 60 parts by mass of polypropylene resin.

The heating shrinkage of the resulting polyolefin foam sheet was measured by the method described in Japanese Patent Application Laid-open No. 2015-187232. The measurement revealed that the heating shrinkage under 140° C. condition was 8.3%.

Comparative Example 11

The foam was produced according to Example 4 described in Japanese Patent Application Laid-open 2016-155344. The physical properties of the resulting polyolefin resin foam sheet are listed in Table 3.

To 100 parts by mass of base resin made by mixing 30 parts by mass of olefin elastomer resin (Mitsui Chemicals, Inc., "TAFMER (registered trademark) PN-3560" (melt flow rate: 6.0 g/10 min)), 50 parts by mass of polypropylene resin (Prime Polymer Co., Ltd., product name "Prime Polypro (registered trademark) J452 HP" (melt flow rate: 3.5 g/10 min)), and 20 parts by mass of polyethylene resin (Nippon Polyethylene, product name "Novatec (registered trademark) LL UJ960" (melt flow rate: 5.0 g/10 min)), 6.7 parts by mass of blowing agent (Eiwa Kasei Kogyo, product name: "VINIHOL (registered trademark) AC #R"), 1.2 parts by mass of antioxidant (BASF, product name: "IRGANOX (registered trademark) 1010") and 4.4 parts by mass of cross-linking auxiliary aid (Wako Pure Chemical Industries, 55% divinylbenzene) were added and mixed using a Henschel mixer. The mixture was melt-extruded using an extruder and a T-die at a temperature of 170° C. and a draw down ratio of 1.4 to produce the polyolefin resin sheet (foamable sheet) with a thickness of 1.5 mm.

One surface of the resulting polyolefin resin sheet was continuously irradiated with 60-kGy radiation at an acceleration voltage of 800 kV to obtain the cross-linked foam sheet.

The rolled cross-linked foamable sheet was floated on the salt bath at 220° C. while heated from the top with the infrared heater and foamed to adjust the machine direction stretch ratio to 3.2 for foaming. It was cooled with water at 60° C., the foam surface was rinsed with water, and then dried to obtain the polyolefin resin foam sheet.

Comparative Example 12

The foam was produced according to Example 5 described in Japanese Patent Application Laid-open 2016-155344. The physical properties of the resulting polyolefin resin foam sheet are listed in Table 3.

It was produced in the same way as in Comparative Example 11, except that the blending ratio of the polypropylene resin in the base resin was changed to 60 parts by mass and the blending ratio of the polyethylene resin was changed to 10 parts by mass.

Comparative Example 13

It was produced in the same way as in Example 1, except that the draw down ratio was set to 1.0, the sheet thickness was set to 1.8 mm, and the machine direction stretch ratio was adjusted to 3.5. The physical properties of the resulting polyolefin resin foam sheet are listed in Table 3.

Comparative Example 14

It was produced in the same way as in Example 1, except that the draw down ratio was set to 1.6, the sheet thickness was set to 1.8 mm, and the machine direction stretch ratio was adjusted to 3.5. The physical properties of the resulting polyolefin resin foam sheet are listed in Table 3.

TABLE 1

| Item | | | Unit | Example 1 | 2 | 3 | 4 | 5 | 6 | 7 | 8 | 9 |
|---|---|---|---|---|---|---|---|---|---|---|---|---|
| Base resin (100 parts by mass) | Polyethylene resin | | % by mass | 13 | 11 | 11 | 11 | 11 | 11 | 11 | 10 | — |
| | Polypropylene resin | | | 67 | 58 | 58 | 58 | 58 | 58 | 58 | 50 | 80 |
| | Olefin elastomer | | | 20 | 31 | 31 | 31 | 31 | 31 | 31 | 40 | 20 |
| | Maximum melting point | | ° C. | 148 | 148 | 148 | 148 | 148 | 148 | 148 | 148 | 148 |
| Additives | Blowing agent | | Parts by mass | 6.7 | 6.7 | 6.7 | 9.2 | 4.7 | 6.7 | 6.7 | 6.7 | 6.7 |
| | Cross-linking auxiliary agent | | | 4.4 | 4.4 | 4.4 | 4.4 | 4.4 | 4.4 | 4.4 | 4.4 | 4.4 |
| | Antioxidant | | | 1.2 | 1.2 | 1.2 | 1.2 | 1.2 | 1.2 | 1.2 | 1.2 | 1.2 |
| Production condition | Draw down ratio at sheet formation step | | — | 1.4 | 1.4 | 1.4 | 1.4 | 1.4 | 1.4 | 1.4 | 1.4 | 1.4 |
| | Machine direction stretch ratio at foaming step | | — | 2.7 | 2.7 | 2.7 | 3.0 | 2.3 | 2.7 | 2.7 | 2.7 | 2.7 |
| Physical property | Thickness | | mm | 2.5 | 2.5 | 4.0 | 2.5 | 2.4 | 2.6 | 2.5 | 2.6 | 2.5 |
| | Foaming | | Fold | 15.4 | 15.3 | 15.8 | 19.6 | 9.8 | 15.5 | 13.8 | 15.1 | 15.4 |
| | Density | | $kg/m^3$ | 65 | 65 | 63 | 51 | 102 | 64 | 73 | 66 | 65 |
| Gel fraction | Gel fraction of foam | | % | 38 | 39 | 40 | 41 | 39 | 32 | 53 | 38 | 38 |
| | Gel faction of surface layer | $GF_A$ | | 32 | 32 | 34 | 33 | 32 | 27 | 47 | 32 | 32 |
| | | $GF_B$ | | 28 | 29 | 29 | 27 | 28 | 24 | 37 | 27 | 29 |
| | | $GF_A/GF_B$ | — | 1.1 | 1.1 | 1.2 | 1.2 | 1.1 | 1.1 | 1.3 | 1.2 | 1.1 |
| 25% Compressive strength | | | kPa | 110 | 79 | 84 | 46 | 125 | 85 | 91 | 56 | 131 |
| 25% Compressive strength/density | | | kPa $m^3/kg$ | 1.7 | 1.2 | 1.3 | 0.9 | 1.2 | 1.3 | 1.3 | 0.8 | 2.0 |
| Tensile strength | −35° C. | MD | kPa | 2388 | 2244 | 2301 | 2041 | 2569 | 2273 | 2304 | 2113 | 2508 |
| | | TD | | 2144 | 2008 | 2078 | 1802 | 2345 | 1835 | 2025 | 1902 | 2249 |
| | 23° C. | MD | | 1487 | 1454 | 1464 | 1277 | 1855 | 1555 | 1522 | 1440 | 1555 |
| | | TD | | 1223 | 1174 | 1193 | 1098 | 1571 | 1271 | 1290 | 1137 | 1280 |
| | | MD/TD | — | 1.2 | 1.2 | 1.2 | 1.2 | 1.2 | 1.2 | 1.2 | 1.3 | 1.2 |
| Tensile elongation | −35° C. | MD | % | 64 | 80 | 79 | 69 | 87 | 71 | 76 | 97 | 67 |
| | | TD | | 70 | 81 | 80 | 72 | 85 | 81 | 84 | 102 | 74 |
| | 23° C. | MD | | 434 | 458 | 451 | 394 | 473 | 483 | 377 | 489 | 456 |
| | | TD | | 427 | 450 | 433 | 378 | 447 | 456 | 365 | 475 | 448 |
| | | MD/TD | — | 1.0 | 1.0 | 1.0 | 1.0 | 1.1 | 1.1 | 1.0 | 1.0 | 1.0 |
| Tear strength | 23° C. | MD | N/cm | 84 | 77 | 85 | 61 | 87 | 84 | 71 | 76 | 85 |
| | | TD | | 91 | 88 | 90 | 75 | 94 | 92 | 83 | 81 | 90 |
| | | MD/TD | — | 0.9 | 0.9 | 0.9 | 0.8 | 0.9 | 0.9 | 0.9 | 0.9 | 0.9 |
| Dimensional change on heating | 120° C. One hour | MD | % | −1.3 | −1.6 | −1.4 | −1.8 | −1.4 | −1.4 | −1.8 | −1.8 | −1.2 |
| | | TD | | −0.6 | −0.6 | −0.8 | −1.1 | −0.7 | −0.7 | −1.2 | −0.8 | −0.6 |
| | Maximum melting point −20° C. 10 minutes | MD | | −4.5 | −4.7 | −4.2 | −4.5 | −4.9 | −4.4 | −4.6 | −5.0 | −4.2 |
| | | TD | | −3.3 | −3.4 | −3.2 | −3.3 | −3.6 | −3.2 | −3.7 | −3.8 | −3.0 |
| | | MD/TD | — | 1.4 | 1.4 | 1.3 | 1.4 | 1.4 | 1.4 | 1.2 | 1.3 | 1.4 |
| | Maximum melting point +20° C. 10 minutes | MD | % | −27.3 | −28.2 | −27.1 | −27.7 | −28.1 | −28.9 | −29.0 | −27.9 | −25.9 |
| | | TD | | −19.0 | −19.5 | −20.1 | −18.9 | −19.5 | −20.0 | −22.6 | −18.8 | −18.1 |
| | | MD/TD | — | 1.4 | 1.4 | 1.3 | 1.5 | 1.4 | 1.4 | 1.3 | 1.5 | 1.4 |
| Curl height | | | mm | 11 | 13 | 11 | 15 | 9 | 11 | 17 | 14 | 14 |
| Average cell size | Before heating: Foam average cell size | MD | µm | 435 | 456 | 457 | 455 | 419 | 484 | 392 | 471 | 410 |
| | | TD | | 344 | 372 | 370 | 371 | 353 | 385 | 325 | 366 | 361 |
| | | MD/TD | — | 1.3 | 1.2 | 1.2 | 1.2 | 1.2 | 1.3 | 1.2 | 1.3 | 1.1 |
| | Before heating: Surface layer average cell size | $BD_A$ | µm | 342 | 356 | 351 | 360 | 343 | 359 | 335 | 367 | 339 |
| | | $BD_B$ | | 318 | 320 | 323 | 335 | 291 | 309 | 251 | 337 | 320 |
| | | $BD_A/BD_B$ | — | 1.1 | 1.1 | 1.1 | 1.1 | 1.2 | 1.2 | 1.3 | 1.1 | 1.1 |
| | After heating: Foam average cell size | MD | µm | 320 | 333 | 327 | 325 | 303 | 350 | 278 | 341 | 308 |
| | | TD | | 279 | 298 | 300 | 304 | 284 | 311 | 247 | 299 | 300 |
| | | MD/TD | — | 1.1 | 1.1 | 1.1 | 1.1 | 1.1 | 1.1 | 1.1 | 1.1 | 1.0 |
| | Foam average cell size ratio before and afte heating | MD | — | 1.4 | 1.4 | 1.4 | 1.4 | 1.4 | 1.4 | 1.4 | 1.4 | 1.3 |
| | | TD | | 1.2 | 1.2 | 1.2 | 1.2 | 1.2 | 1.2 | 1.3 | 1.2 | 1.2 |
| Formation evaluation result (5-step evaluation) | | | | 5 | 5 | 5 | 5 | 5 | 5 | 4 | 5 | 5 |

TABLE 2

| Item | | | Unit | Example 10 | 11 | 12 | 13 | 14 | 15 | 16 | 17 | 18 |
|---|---|---|---|---|---|---|---|---|---|---|---|---|
| Base resin (100 parts by mass) | Polyethylene resin | | % by mass | 30 | 25 | 11 | 11 | 11 | 11 | — | — | — |
| | Polypropylene resin | | | 30 | 40 | 58 | 58 | 58 | 58 | 67 | 67 | 60 |
| | Olefin elastomer | | | 40 | 35 | 31 | 31 | 31 | 31 | 33 | 33 | 40 |
| | Maximum melting point | | ° C. | 148 | 148 | 148 | 148 | 148 | 148 | 147 | 147 | 147 |
| Additives | Blowing agent | | Parts by mass | 6.7 | 6.7 | 6.7 | 6.7 | 6.7 | 6.7 | 6.5 | 6.5 | 6.5 |
| | Cross-linking auxiliary agent | | | 4.4 | 4.4 | 4.4 | 4.4 | 4.4 | 4.4 | 4.0 | 4.0 | 4.0 |
| | Antioxidant | | | 1.2 | 1.2 | 1.2 | 1.2 | 1.2 | 1.2 | 1.0 | 1.0 | 1.0 |
| Production condition | Draw down ratio at sheet formation step | | — | 1.4 | 1.6 | 1.4 | 1.0 | 1.0 | 1.6 | 1.0 | 1.0 | 1.6 |
| | Machine direction stretch ratio at foaming step | | — | 2.7 | 2.7 | — | 2.0 | 3.1 | 2.0 | 2.7 | 3.1 | 2.7 |
| Physical property | Thickness | | mm | 2.5 | 2.6 | 2.5 | 2.5 | 2.5 | 2.5 | 2.7 | 2.5 | 2.7 |
| | Foaming | | Fold | 15.6 | 15.9 | 15.4 | 14.9 | 14.7 | 15.6 | 15.4 | 14.9 | 15.6 |
| | Density | | kg/m$^3$ | 64 | 63 | 65 | 67 | 68 | 64 | 65 | 67 | 64 |
| Gel fraction | Gel fraction of foam | | % | 39 | 41 | 38 | 38 | 39 | 40 | 58 | 58 | 57 |
| | Gel fraction of surface layer | $GF_A$ | | 32 | 33 | 32 | 32 | 32 | 33 | 49 | 49 | 49 |
| | | $GF_B$ | | 28 | 32 | 29 | 29 | 29 | 29 | 36 | 36 | 35 |
| | | $GF_A/GF_B$ | — | 1.1 | 1.0 | 1.1 | 1.1 | 1.1 | 1.1 | 1.4 | 1.4 | 1.4 |
| 25% Compressive strength | | | kPa | 41 | 65 | 80 | 82 | 80 | 76 | 80 | 82 | 74 |
| 25% Compressive strength/density | | | kPa m$^3$/kg | 0.6 | 1.0 | 1.2 | 1.2 | 1.2 | 1.2 | 1.2 | 1.2 | 1.2 |
| Tensile Strength | −35° C. | MD | kPa | 2034 | 2200 | 2122 | 2100 | 2250 | 2111 | 2101 | 2030 | 2050 |
| | | TD | | 1997 | 1989 | 2097 | 2057 | 2035 | 2060 | 1970 | 1822 | 1982 |
| | 23° C. | MD | | 1402 | 1465 | 1302 | 1354 | 1454 | 1324 | 1514 | 1477 | 1460 |
| | | TD | | 1097 | 1174 | 1295 | 1203 | 1134 | 1215 | 1219 | 1179 | 1100 |
| | | MD/TD | — | 1.3 | 1.2 | 1.0 | 1.1 | 1.3 | 1.1 | 1.2 | 1.3 | 1.3 |
| Tensile Elongation | −35° C. | MD | % | 100 | 85 | 76 | 80 | 80 | 78 | 97 | 91 | 105 |
| | | TD | | 105 | 84 | 78 | 81 | 81 | 80 | 109 | 99 | 110 |
| | 23° C. | MD | | 495 | 448 | 445 | 455 | 449 | 440 | 395 | 385 | 444 |
| | | TD | | 463 | 437 | 438 | 451 | 420 | 422 | 351 | 339 | 397 |
| | | MD/TD | — | 1.1 | 1.0 | 1.0 | 1.0 | 1.1 | 1.0 | 1.1 | 1.1 | 1.1 |
| Tear Strength | 23° C. | MD | N/cm | 75 | 75 | 79 | 80 | 76 | 79 | 71 | 68 | 69 |
| | | TD | | 80 | 86 | 81 | 89 | 85 | 85 | 82 | 80 | 81 |
| | | MD/TD | — | 0.9 | 0.9 | 1.0 | 0.9 | 0.9 | 0.9 | 0.9 | 0.9 | 0.9 |
| Dimensional change on heating | 120° C. One hour | MD | % | −1.9 | −1.8 | −1.2 | −1.2 | −1.6 | −1.5 | −1.6 | −1.8 | −1.9 |
| | | TD | | −1.0 | −0.9 | −1.1 | −1.1 | −0.6 | −1.2 | −1.2 | −1.4 | −1.5 |
| | Maximum melting point −20° C. 10 minutes | MD | | −5.0 | −4.5 | −3.3 | −3.7 | −4.9 | −4.2 | −4.4 | −5.0 | −4.9 |
| | | TD | | −3.9 | −3.4 | −3.2 | −3.4 | −3.5 | −3.4 | −3.3 | −3.4 | −3.7 |
| | | MD/TD | — | 1.3 | 1.3 | 1.0 | 1.1 | 1.4 | 1.2 | 1.3 | 1.5 | 1.3 |
| | Maximum Melting Point +20° C. 10 minutes | MD | % | −34.5 | −32.5 | −21.3 | −24.2 | −33.4 | −27.6 | −30.5 | −34.2 | −33.0 |
| | | TD | | −23.1 | −22.5 | −21.0 | −19.5 | −23.0 | −19.9 | −23.4 | −23.3 | −22.9 |
| | | MD/TD | — | 1.5 | 1.4 | 1.0 | 1.2 | 1.5 | 1.4 | 1.3 | 1.5 | 1.4 |
| Curl height | | | mm | 15 | 13 | 10 | 9 | 14 | 12 | 17 | 18 | 19 |
| Average cell size | Before Heating: Foam average cell size | MD | µm | 452 | 438 | 411 | 430 | 465 | 433 | 400 | 419 | 406 |
| | | TD | | 349 | 357 | 403 | 389 | 352 | 379 | 327 | 315 | 311 |
| | | MD/TD | — | 1.3 | 1.2 | 1.0 | 1.1 | 1.3 | 1.1 | 1.2 | 1.3 | 1.3 |
| | Before Heating: Surface layer average cell size | $BD_A$ | µm | 356 | 350 | 346 | 350 | 342 | 338 | 330 | 335 | 319 |
| | | $BD_B$ | | 340 | 329 | 305 | 322 | 325 | 310 | 263 | 258 | 255 |
| | | $BD_A/BD_B$ | — | 1.0 | 1.1 | 1.1 | 1.1 | 1.1 | 1.1 | 1.3 | 1.3 | 1.3 |
| | After Heating: Foam average cell size | MD | µm | 297 | 303 | 332 | 343 | 319 | 352 | 298 | 282 | 285 |
| | | TD | | 258 | 277 | 351 | 315 | 271 | 308 | 251 | 233 | 244 |
| | | MD/TD | — | 1.2 | 1.1 | 0.9 | 1.1 | 1.2 | 1.1 | 1.2 | 1.2 | 1.2 |
| | Foam average cell size ratio before and after heating | MD | — | 1.5 | 1.4 | 1.2 | 1.3 | 1.5 | 1.2 | 1.3 | 1.5 | 1.4 |
| | | TD | | 1.4 | 1.3 | 1.1 | 1.2 | 1.3 | 1.2 | 1.3 | 1.4 | 1.3 |
| Formation evaluation result (5-step evaluation) | | | | 3 | 4 | 5 | 5 | 4 | 5 | 4 | 3 | 4 |

TABLE 3

| Item | | | Unit | Example 1 | 2 | 3 | 4 | 5 | 6 | 7 |
|---|---|---|---|---|---|---|---|---|---|---|
| Base resin (100 parts by mass) | Polyethylene resin | | % by mass | 20 | 13 | 10 | 40 | 30 | — | 11 |
| | Polypropylene resin | | | 80 | 67 | 50 | 30 | 25 | 90 | 58 |
| | Olefin elastomer | | | — | 20 | 40 | 30 | 45 | 10 | 31 |
| | Maximum melting point | | ° C. | 148 | 148 | 148 | 148 | 148 | 148 | 148 |
| Additives | Blowing agent | | Parts by mass | 6.7 | 6.7 | 6.7 | 6.7 | 6.7 | 6.7 | 6.7 |
| | Cross-linking auxiliary agent | | | 4.4 | 4.4 | 4.4 | 4.4 | 4.4 | 4.4 | 4.4 |
| | Antioxidant | | | 1.2 | 1.2 | 1.2 | 1.2 | 1.2 | 1.2 | 1.2 |
| Production Condition | Draw down ratio at sheet formation step | | — | 1.4 | 1.4 | 1.4 | 1.4 | 1.4 | 1.4 | 1.6 |
| | Machine direction stretch ratio at foaming step | | — | 2.7 | 3.1 | 3.1 | 2.7 | 2.7 | 2.7 | 3.1 |
| Physical property | Thickness | | mm | 2.5 | 2.6 | 2.5 | 2.5 | 2.5 | 2.5 | 2.5 |
| | Foaming | | Fold | 15.2 | 15.3 | 14.9 | 15.6 | 14.9 | 14.9 | 15.4 |
| | Density | | $kg/m^3$ | 66 | 66 | 67 | 64 | 67 | 67 | 65 |
| | Gel fraction | Gel fraction of foam | % | 39 | 40 | 40 | 40 | 39 | 39 | 41 |
| | | Gel fraction of surface layer $GF_A$ | | 33 | 35 | 34 | 33 | 32 | 32 | 36 |
| | | $GF_B$ | | 29 | 30 | 28 | 29 | 30 | 29 | 30 |
| | | $GF_A/GF_B$ | — | 1.1 | 1.2 | 1.2 | 1.1 | 1.1 | 1.1 | 1.2 |
| | 25% Compressive strength | | kPa | 178 | 109 | 61 | 47 | 35 | 171 | 81 |
| | 25% Compressive strength/density | | kPa $m^3/kg$ | 2.7 | 1.7 | 0.9 | 0.7 | 0.5 | 2.6 | 1.2 |
| | Tensile strength | −35° C. MD | kPa | 2743 | 2322 | 2299 | 2077 | 1872 | 2661 | 2137 |
| | | TD | | 2404 | 1873 | 1922 | 2031 | 1830 | 2332 | 1898 |
| | | 23° C. MD | | 1520 | 1533 | 1488 | 1430 | 1290 | 1474 | 1497 |
| | | TD | | 1307 | 1144 | 1139 | 1089 | 1011 | 1270 | 1105 |
| | | MD/TD | — | 1.2 | 1.3 | 1.3 | 1.3 | 1.3 | 1.2 | 1.4 |
| | Tensile elongation | −35° C. MD | % | 14 | 62 | 96 | 90 | 102 | 23 | 77 |
| | | TD | | 15 | 70 | 100 | 89 | 107 | 27 | 80 |
| | | 23° C. MD | | 368 | 424 | 485 | 460 | 490 | 385 | 425 |
| | | TD | | 357 | 409 | 460 | 445 | 470 | 377 | 409 |
| | | MD/TD | — | 1.0 | 1.0 | 1.1 | 1.0 | 1.0 | 1.0 | 1.0 |
| | Tear strength | 23° C. MD | N/cm | 95 | 67 | 68 | 74 | 70 | 90 | 64 |
| | | TD | | 100 | 89 | 86 | 81 | 77 | 93 | 85 |
| | | MD/TD | — | 1.0 | 0.8 | 0.8 | 0.9 | 0.9 | 1.0 | 0.8 |
| | Dimensional change on heating | 120° C. One hour MD | % | −0.8 | −1.8 | −2.1 | −2.1 | −2.3 | −0.9 | −2.0 |
| | | TD | | −0.7 | −1.0 | −1.2 | −1.3 | −1.5 | −0.8 | −1.0 |
| | | Maximum melting point −20° C. 10 minutes MD | | −4.1 | −5.4 | −5.7 | −5.6 | −6.2 | −4.2 | −5.6 |
| | | TD | | −3.3 | −3.5 | −3.6 | −3.6 | −3.9 | −3.5 | −3.7 |
| | | MD/TD | — | 1.2 | 1.5 | 1.6 | 1.6 | 1.6 | 1.2 | 1.5 |
| | | Maximum melting point +20° C. 10 minutes MD | % | −28.2 | −36.7 | −37.1 | −35.5 | −36.5 | −29.9 | −35.5 |
| | | TD | | −20.0 | −22.9 | −23.3 | −22.8 | −22.3 | −21.2 | −22.3 |
| | | MD/TD | — | 1.4 | 1.6 | 1.6 | 1.6 | 1.6 | 1.4 | 1.6 |
| | Curl height | | mm | 12 | 12 | 15 | 14 | 17 | 12 | 12 |
| Average cell size | Before Heating | Foam average cell size MD | µm | 455 | 481 | 493 | 465 | 450 | 440 | 439 |
| | | TD | | 381 | 352 | 364 | 352 | 353 | 372 | 325 |
| | | MD/TD | — | 1.2 | 1.4 | 1.4 | 1.3 | 1.3 | 1.2 | 1.4 |
| | | Surface layer average cell size $BD_A$ | µm | 372 | 351 | 365 | 374 | 360 | 361 | 321 |
| | | $BD_B$ | | 332 | 333 | 341 | 330 | 319 | 329 | 291 |
| | | $BD_A/BD_B$ | — | 1.1 | 1.1 | 1.1 | 1.1 | 1.1 | 1.1 | 1.1 |
| | After Heating | Foam average cell size MD | µm | 330 | 309 | 311 | 299 | 290 | 309 | 281 |
| | | TD | | 301 | 281 | 279 | 253 | 260 | 294 | 269 |
| | | MD/TD | — | 1.1 | 1.1 | 1.1 | 1.2 | 1.1 | 1.1 | 1.0 |
| | Foam average cell size ratio before and after heating | MD | — | 1.4 | 1.6 | 1.6 | 1.6 | 1.6 | 1.4 | 1.6 |
| | | TD | | 1.3 | 1.3 | 1.3 | 1.4 | 1.4 | 1.3 | 1.2 |
| Formation evaluation result (5-step evaluation) | | | | 5 | 2 | 2 | 2 | 1 | 5 | 2 |

| Item | | Unit | Example 8 | 9 | 10 | 11 | 12 | 13 | 14 |
|---|---|---|---|---|---|---|---|---|---|
| Base resin (100 parts by mass) | Polyethylene resin | % by mass | 11 | — | — | 20 | 10 | 11 | 11 |
| | Polypropylene resin | | 58 | 67 | 60 | 50 | 60 | 58 | 58 |
| | Olefin elastomer | | 31 | 33 | 40 | 30 | 30 | 31 | 31 |
| | Maximum melting point | ° C. | 148 | 147 | 147 | 161 | 156 | 148 | 148 |

TABLE 3-continued

| | | | | | | | | | | | |
|---|---|---|---|---|---|---|---|---|---|---|---|
| Additives | | Blowing agent | | Parts by mass | 6.7 | 6.5 | 6.5 | 6.7 | 6.7 | 6.7 | 6.7 |
| | | Cross-linking auxiliary agent | | | 4.4 | 4.0 | 4.0 | 4.4 | 4.4 | 4.4 | 4.4 |
| | | Antioxidant | | | 1.2 | 1.0 | 1.0 | 1.2 | 1.2 | 1.2 | 1.2 |
| Production Condition | | Draw down ratio at sheet formation step | | — | 1.4 | 1.6 | 1.6 | 1.4 | 1.4 | 1.0 | 1.6 |
| | | Machine direction stretch ratio at foaming step | | — | 3.1 | 3.1 | 3.1 | 3.2 | 3.2 | 3.5 | 3.5 |
| Physical property | | Thickness | | mm | 2.4 | 2.5 | 2.5 | 2.5 | 2.5 | 2.5 | 2.5 |
| | | Foaming | | Fold | 14.7 | 14.3 | 14.7 | 14.7 | 15.2 | 14.9 | 14.5 |
| | | Density | | kg/m$^3$ | 68 | 70 | 68 | 68 | 66 | 67 | 69 |
| | Gel fraction | Gel fraction of foam | | % | 45 | 58 | 57 | 40 | 39 | 40 | 39 |
| | | Gel fraction of surface layer | $GF_A$ | | 39 | 49 | 49 | 36 | 34 | 34 | 33 |
| | | | $GF_B$ | | 29 | 36 | 35 | 30 | 28 | 29 | 29 |
| | | | $GF_A/GF_B$ | — | 1.3 | 1.4 | 1.4 | 1.2 | 1.2 | 1.2 | 1.1 |
| | 25% Compressive strength | | | kPa | 80 | 81 | 76 | 70 | 80 | 82 | 86 |
| | 25% Compressive strength/density | | | kPa m$^3$/kg | 1.2 | 1.2 | 1.1 | 1.0 | 1.2 | 1.2 | 1.2 |
| | Tensile strength | −35° C. | MD | kPa | 2301 | 2075 | 2040 | 2990 | 2305 | 2250 | 2270 |
| | | | TD | | 1903 | 1859 | 1980 | 2001 | 2275 | 1890 | 1903 |
| | | 23° C. | MD | | 1442 | 1511 | 1430 | 1479 | 1525 | 1421 | 1449 |
| | | | TD | | 1062 | 1116 | 1051 | 1090 | 1122 | 1002 | 1035 |
| | | | MD/TD | — | 1.4 | 1.4 | 1.4 | 1.4 | 1.4 | 1.4 | 1.4 |
| | Tensile elongation | −35° C. | MD | % | 78 | 95 | 99 | 72 | 70 | 73 | 75 |
| | | | TD | | 81 | 103 | 107 | 83 | 79 | 78 | 76 |
| | | 23° C. | MD | | 400 | 389 | 432 | 367 | 357 | 399 | 406 |
| | | | TD | | 379 | 340 | 390 | 343 | 335 | 402 | 390 |
| | | | MD/TD | — | 1.1 | 1.1 | 1.1 | 1.1 | 1.1 | 1.0 | 1.0 |
| | Tear strength | 23° C. | MD | N/cm | 72 | 65 | 64 | 74 | 77 | 76 | 75 |
| | | | TD | | 81 | 82 | 82 | 88 | 92 | 84 | 84 |
| | | | MD/TD | — | 0.9 | 0.8 | 0.8 | 0.8 | 0.8 | 0.9 | 0.9 |
| | Dimensional change on heating | 120° C. One hour | MD | % | −2.1 | −1.9 | −2.1 | −1.8 | −1.9 | −2.0 | −2.2 |
| | | | TD | | −1.0 | −1.6 | −1.9 | −1.4 | −1.5 | −0.6 | −1.6 |
| | | Maximum melting point −20° C. 10 minutes | MD | | −5.5 | −5.6 | −6.7 | −6.0 | −5.9 | −6.0 | −6.4 |
| | | | TD | | −3.3 | −3.6 | −4.3 | −3.8 | −3.6 | −3.5 | −4.0 |
| | | | MD/TD | — | 1.7 | 1.6 | 1.6 | 1.6 | 1.6 | 1.7 | 1.6 |
| | | Maximum melting point +20° C. 10 minutes | MD | % | −35.8 | −36.1 | −37.5 | −36.9 | −36.5 | −38.3 | −39.5 |
| | | | TD | | −23.0 | −23.0 | −22.1 | −23.5 | −22.9 | −23.1 | −25.1 |
| | | | MD/TD | — | 1.6 | 1.6 | 1.7 | 1.6 | 1.6 | 1.7 | 1.6 |
| | | Curl height | | mm | 16 | 17 | 19 | 15 | 15 | 18 | 17 |
| | Average cell size | Before Heating: Foam average cell size | MD | µm | 405 | 458 | 434 | 455 | 453 | 495 | 487 |
| | | | TD | | 300 | 339 | 310 | 331 | 338 | 340 | 339 |
| | | | MD/TD | — | 1.4 | 1.4 | 1.4 | 1.4 | 1.3 | 1.5 | 1.4 |
| | | Before Heating: Surface layer average cell size | $BD_A$ | µm | 375 | 335 | 329 | 343 | 330 | 345 | 340 |
| | | | $BD_B$ | | 279 | 249 | 255 | 290 | 267 | 300 | 311 |
| | | | $BD_A/BD_B$ | — | 1.3 | 1.3 | 1.3 | 1.2 | 1.2 | 1.2 | 1.1 |
| | | After Heating: Foam average cell size | MD | µm | 255 | 295 | 275 | 291 | 288 | 295 | 290 |
| | | | TD | | 250 | 251 | 239 | 265 | 264 | 250 | 255 |
| | | | MD/TD | — | 1.0 | 1.2 | 1.2 | 1.1 | 1.1 | 1.2 | 1.1 |
| | | Foam average cell size ratio before and after heating | MD | — | 1.6 | 1.6 | 1.6 | 1.6 | 1.6 | 1.7 | 1.7 |
| | | | TD | | 1.2 | 1.4 | 1.3 | 1.2 | 1.3 | 1.4 | 1.3 |
| Formation evaluation result (5-step evaluation) | | | | | 1 | 1 | 1 | 2 | 2 | 1 | 1 |

The results of the examples in Table 1 demonstrates that excellent flexibility and formability can be achieved by the polyolefin resin foam sheets containing a resin mixture as a base resin in Examples 1 to 18. The resin mixture contains 0% by mass or more and 30% by mass or less of polyethylene resin, 30% by mass or more and 80% by mass or less of polypropylene resin, and 20% by mass or more and 40% by mass or less of a polyolefin elastomer. The polyolefin resin foam sheets fulfill −35% or more and 0% or less for dimensional changes under heating for 10 minutes at a temperature 20° C. higher than the maximum melting point that is the highest melting peak in the differential scanning calorimetry. As well, good results without defect size were obtained for the polyolefin resin foam sheet fulfilling: 2.5 or less for a value obtained by dividing a 25% compressive strength (kPa) by a density (kg/m$^3$); and −35% or more and 0% or less for dimensional changes obtained under heating for 10 minutes at a temperature 20° C. higher than the maximum melting point that is the highest melting peak in the differential scanning calorimetry.

The invention claimed is:

1. A polyolefin resin foam sheet comprising:

a blowing agent and/or a decomposition product of a blowing agent, and an antioxidant and/or a decomposition product of an antioxidant, and a resin mixture as a base resin, the resin mixture comprising 10% by mass or more and 13% by mass or less of polyethylene resin, 50% by mass or more and 67% by mass or less of polypropylene resin, and 20% by mass or more and 40% by mass or less of a polyolefin elastomer, wherein the sum of the content of the polyethylene resin, the polypropylene resin, and the polyolefin elastomer is 100%, the polyolefin resin foam sheet having −28.9% to 0% for dimensional changes in machine direction and −21.0% to 0% in transverse direction under heating for 10 minutes at a temperature 20° C. higher than a maximum melting point that is a highest melting peak in a differential scanning calorimetry and having a −24.5% to 0% for an average of dimensional change in the machine direction and dimensional change in the transverse direction under heating for 10 minutes at the temperature 20° C. higher than the maximum melting point that is the highest melting peak in the differential scanning calorimetry;

wherein the MD stretch ratio is controlled within approximately 2.0-2.7 and the draw down ratio is held at or near 1.0-1.6 during sheet formation.

2. The polyolefin resin foam sheet according to claim 1, wherein the polyolefin resin foam sheet has a thickness of 1 mm or more and 5 mm or less, a density of 40 kg/m$^3$ or more and 100 kg/m$^3$ or less, and a gel fraction of 30% or more and 60% or less.

3. The polyolefin resin foam sheet according to claim 2, wherein the polyolefin resin foam sheet satisfies 0.5 or more and 1.5 or less for a ratio of the dimensional change in the machine direction to the dimensional change in the transverse direction under the heating for 10 minutes at the temperature 20° C. higher than the maximum melting point that is the highest melting peak in the differential scanning calorimetry.

4. The polyolefin resin foam sheet according to claim 2, wherein the polyolefin resin foam sheet satisfies-5% or more and 0% or less for dimensional changes in the machine and transverse directions obtained under the heating for 10 minutes at a temperature of 20 C lower than the maximum melting point that is the highest melting peak in the differential scanning calorimetry.

5. The polyolefin resin foam sheet according to claim 2, wherein the polyolefin resin foam sheet satisfies 0.7 or more and 1.3 or less for an average cell size ratio $BD_{MD}/BD_{TD}$ that is obtained by dividing an average cell size $BD_{MD}$ in the machine direction by an average cell size $BD_{TD}$ in the transverse direction.

6. The polyolefin resin foam sheet according to claim 2, wherein the polyolefin resin foam sheet satisfies 0.7 or more and 1.3 or less for a ratio of a tensile strength in the machine direction to a tensile strength in the transverse direction at 23° C.

7. The polyolefin resin foam sheet according to claim 2, wherein a curl height of the polyolefin resin foam sheet is greater than or equal to a thickness of the foam sheet, and the curl height of the polyolefin resin foam sheet is less than or equal to 15 mm, the curl height being obtained under the heating for 10 minutes at the temperature 20° C. higher than the maximum melting point that is the highest melting peak in the differential scanning calorimetry.

8. The polyolefin resin foam sheet according to claim 2, wherein the polyolefin resin foam sheet has 1.0 or more and 1.2 or less for a surface layer gel fraction ratio calculated by dividing $GF_A$ by $GF_B$, where $GF_A$ and $GF_B$ respectively represent larger and smaller ones of gel fractions of first and fifth layers obtained by dividing the polyolefin resin foam sheet equally into five layers, which are labeled as the first to fifth layers in this order, in a thickness direction.

9. The polyolefin resin foam sheet according to claim 2, wherein the polyolefin resin foam sheet has 1.0 or more and 1.2 or less for a surface layer average cell size ratio calculated by dividing $BD_A$ by $BD_B$, where $BD_A$ and $BD_B$ respectively represent larger and smaller ones of average cell sizes BD of first and fifth layers obtained by dividing the polyolefin resin foam sheet equally into five layers, which are labeled as the first to fifth layers in this order, in a thickness direction.

10. The polyolefin resin foam sheet according to claim 2, wherein the polyolefin resin foam sheet has 1.0 or more and 1.5 or less for an average cell size ratio before and after heating calculated by dividing $BD_{BF}$ by $BD_{AF}$, where $BD_{BF}$ and $BD_{AF}$ respectively represent average cell sizes of the polyolefin resin foam sheet obtained before and after the heating for 10 minutes at the temperature 20° C. higher than the maximum melting point that is the highest melting peak in the differential scanning calorimetry for both machine and transverse directions.

11. A laminate formed by laminating one or more type(s) of a surface material selected from the group consisting of sheet, film, cloth, non-woven fabric and skin, on the polyolefin resin foam sheet according to claim 2.

* * * * *